(12) United States Patent  (10) Patent No.: US 8,492,043 B2
Shintani et al.  (45) Date of Patent: Jul. 23, 2013

(54) FUEL CELL, FUEL CELL SYSTEM, AND METHOD FOR OPERATING FUEL CELL

(75) Inventors: Haruhiko Shintani, Osaka (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 12/810,268

(22) PCT Filed: Oct. 28, 2009

(86) PCT No.: PCT/JP2009/005697
§ 371 (c)(1),
(2), (4) Date: Jun. 23, 2010

(87) PCT Pub. No.: WO2010/050199
PCT Pub. Date: May 6, 2010

(65) Prior Publication Data
US 2010/0273077 A1  Oct. 28, 2010

(30) Foreign Application Priority Data
Oct. 29, 2008 (JP) ................. 2008-278712

(51) Int. Cl.
*H01M 8/04* (2006.01)
*H01M 4/02* (2006.01)

(52) U.S. Cl.
USPC ........... 429/434; 429/433; 429/442; 429/443; 429/523; 429/456

(58) Field of Classification Search
None
See application file for complete search history.

(56) References Cited

U.S. PATENT DOCUMENTS

| | | | |
|---|---|---|---|
| 2004/0091761 A1 | 5/2004 | Enjoji et al. | |
| 2005/0233181 A1 | 10/2005 | Wariishi et al. | |
| 2008/0233447 A1 * | 9/2008 | Gemba et al. | 429/26 |

FOREIGN PATENT DOCUMENTS

| | | | |
|---|---|---|---|
| JP | 06-150944 | | 5/1994 |
| JP | 07-085874 | | 3/1995 |
| JP | 08-102328 | | 4/1996 |
| JP | 11-312531 | | 11/1999 |
| JP | 2003-168443 | | 6/2003 |
| JP | 2004-031134 | | 1/2004 |
| JP | 2004-031135 | * | 1/2004 |
| JP | 2005-044797 | | 2/2005 |
| JP | 2005-251491 | | 9/2005 |
| JP | 2005-317287 | | 11/2005 |
| JP | 2008-034253 | | 2/2008 |

* cited by examiner

*Primary Examiner* — Barbara Gilliam
*Assistant Examiner* — Angela Martin
(74) *Attorney, Agent, or Firm* — McDermott Will & Emery LLP

(57) ABSTRACT

A fuel cell of the present invention includes cell blocks (101, 102) each formed by stacking cells (51, 52) and a cooling medium connecting channel (103) connecting a cell block internal cooling medium channel (153A) of the cell block (101) and a cell block internal cooling medium channel (153B) of the cell block (102) in series. A catalyst layer includes a catalyst support and polymer electrolyte adhered to the catalyst support, the catalyst support containing an electrode catalyst and carbon powder supporting the electrode catalyst. The catalyst layer in the cell 52 of the cell block (102) located downstream of the cooling medium connecting channel (103) is higher or larger in at least one selected from the group consisting of a density of an ion exchange group per unit volume of the catalyst layer, an electrode catalyst supporting amount of the catalyst support of the catalyst layer, and a catalyst supporting rate of the catalyst layer, than the catalyst layer of the cell 51 of the cell block 101 located upstream of the cooling medium connecting channel 103.

18 Claims, 23 Drawing Sheets

FUEL CELL, FUEL CELL SYSTEM, AND METHOD FOR OPERATING FUEL CELL

RELATED APPLICATIONS

This application is the U.S. National Phase under 35 U.S.C. §371 of International Application No. PCT/JP2009/005697, filed on Oct. 28, 2009, which in turn claims the benefit of Japanese Application No. 2008-278712, filed on Oct. 29, 2008, the disclosures of which Applications are incorporated by reference herein.

TECHNICAL FIELD

The present invention relates to a fuel cell, a fuel cell system, and a method for operating the fuel cell, and particularly to the configuration of a fuel cell including two cell stacks.

BACKGROUND ART

A polymer electrolyte fuel cell (hereinafter referred to as a "PEFC") generates electricity and heat at the same time by causing a hydrogen-containing fuel gas obtained by reforming a material gas, such as a city gas, and an oxygen-containing oxidizing gas, such as air, to electrochemically react with each other. A unit cell (cell) of the PEFC includes an MEA (Membrane Electrode Assembly; polymer electrolyte layer-electrode stack body), gaskets, and electrically-conductive plate-shaped separators. The MEA is constituted by a polymer electrolyte layer and a pair of gas diffusion electrodes. A groove-like gas channel through which the fuel gas or the oxidizing gas (each of these gases is called a reactant gas) flows is formed on a main surface of the separator which surface contacts the gas diffusion electrode. A groove-like cooling medium channel through which a cooling medium for recovering generated heat and cooling down an inside of the cell is formed on a main surface opposite to the main surface contacting the gas diffusion electrode. A pair of separators sandwich the MEA, around a peripheral portion of which the gaskets are disposed. Thus, the cell is formed. A cell stack is formed by stacking a plurality of cells, sandwiching the stacked cells by end plates from both sides, and fastening the end plates and the cells using fastening members.

In the case of using such PEFC as a domestic fuel cell, the PEFC recovers the generated heat and utilizes the heat for a domestic hot-water supply. Thus, energy use efficiency is improved. Conventionally, in the domestic fuel cell, the temperature of the hot water used in the hot-water supply is around 60° C. However, in the case of considering the reduction in size of a hot water tank and the application to floor heating, the hot water of higher temperature is required. In order to generate the hot water of such high temperature, the temperature of the cooling medium at an exit of the cell stack needs to be increased.

Moreover, in the case of using the PEFC as a car fuel cell, the car fuel cell needs to generate higher output than the domestic fuel cell, so that it generates a large amount of heat. Therefore, in order to efficiently cool down the cell stack within a limited mount space, the temperature difference between the cooling medium and outside air needs to be large. On this account, in the car fuel cell, the temperature of the cooling medium at the exit of the cell stack needs to be as high as possible.

In order to increase the temperature of the cooling medium at the exit of the fuel cell stack, the operating temperature of the cell stack needs to be increased. However, if the operating temperature is increased, a relative humidity around the MEA decreases, polymer electrolytes contained in the polymer electrolyte membrane and the catalyst layer dry, ion conductivity deteriorates, and power generation efficiency deteriorates. Moreover, in order to increase the relative humidity around the MEA, it is effective to increase a humidification temperature of the reactant gas. However, in order to do this, the performance of a humidifier needs to be increased, and this leads to the increase in cost and size of the fuel cell system.

To solve the above problems, known is a fuel cell in which: each of a first cell assembly and a second cell assembly is constituted by a plurality of unit cells; and in order to supply and/or circulate the reactant gas and the cooling medium to or in the first cell assembly and the second cell assembly, a reactant gas channel and a cooling medium channel are formed so as to be communicated with each other in series in the first cell assembly and the second cell assembly (see PTL 1 for example). In accordance with the fuel cell disclosed in PTL 1, the cooling medium which has cooled down the first cell assembly is supplied to the second cell assembly. Therefore, the second cell assembly is basically higher in temperature than the first cell assembly. Thus, the cooling medium discharged from the second cell assembly can be easily increased in temperature.

CITATION LIST

Patent Literature

PTL 1: Japanese Laid-Open Patent Application Publication No. 2004-31135

SUMMARY OF INVENTION

Technical Problem

However, even in the fuel cell disclosed in PTL 1, there is still room for improvement in that in the second cell assembly which is high in temperature, since the water generated by the reaction between the reactant gases is not enough, the polymer electrolytes contained in the polymer electrolyte membrane and the catalyst layer dry, the ion conductivity deteriorates, and the power generation efficiency deteriorates.

The present invention was made to solve the above problems, and an object of the present invention is to provide a fuel cell capable of increasing the temperature of the cooling medium discharged from the cell stack and realizing high power generation efficiency without increasing the cost and size of the humidifier.

Solution to Problem

To solve the above conventional problems, a fuel cell according to the present invention includes: a plurality of cell blocks, each of which is formed by stacking cells each including a pair of electrodes and a polymer electrolyte layer sandwiched between the pair of electrodes; a cell block internal fuel gas channel which penetrates each of the cell blocks and through which a fuel gas flows so as to flow through the cells of the cell block; a cell block internal oxidizing gas channel which penetrates each of the cell blocks and through which an oxidizing gas flows so as to flow through the cells of the cell block; a cell block internal cooling medium channel which penetrates each of the cell blocks and through which a cooling medium flows so as to flow through the cells of the cell block;

and a cooling medium connecting channel connecting the cell block internal cooling medium channel of one of the cell blocks and the cell block internal cooling medium channel of the other cell block in series, wherein: the catalyst layer includes a catalyst support and a polymer electrolyte adhered to the catalyst support, the catalyst support containing an electrode catalyst and carbon powder supporting the electrode catalyst; and the catalyst layer in the cell of the cell block located downstream of the cooling medium connecting channel is higher or larger in at least one selected from the group consisting of a density of an ion exchange group per unit volume of the catalyst layer, an electrode catalyst supporting amount of the catalyst support of the catalyst layer, and a catalyst supporting rate of the catalyst layer, than the catalyst layer in the cell of the cell block located upstream of the cooling medium connecting channel.

With this, the cooling medium discharged from the fuel cell (from the cell block internal cooling medium channel of the cell block located at an extreme downstream side) can be easily increased in temperature, and the power generation efficiency of the entire fuel cell can be improved.

Moreover, in the fuel cell according to the present invention, the density of the ion exchange group per unit volume of the catalyst layer may be a ratio of a mass of the polymer electrolyte to a mass of the catalyst support of the catalyst layer and/or an ion exchange capacity of the polymer electrolyte of the catalyst support of the catalyst layer.

Moreover, in the fuel cell according to the present invention, the catalyst layer in the cell of the cell block located downstream of the cooling medium connecting channel may be higher in the ratio of the mass of the polymer electrolyte to the mass of the catalyst support of the catalyst layer than the catalyst layer in the cell of the cell block located upstream of the cooling medium connecting channel.

Moreover, in the fuel cell according to the present invention, the catalyst layer in the cell of the cell block located downstream of the cooling medium connecting channel may be larger in the ion exchange capacity of the polymer electrolyte of the catalyst support of the catalyst layer than the catalyst layer in the cell of the cell block located upstream of the cooling medium connecting channel.

Moreover, in the fuel cell according to the present invention, the catalyst layer in the cell of the cell block located downstream of the cooling medium connecting channel may be larger in the electrode catalyst supporting amount of the catalyst support of the catalyst layer than the catalyst layer in the cell of the cell block located upstream of the cooling medium connecting channel.

Moreover, in the fuel cell according to the present invention, the cell blocks may be electrically connected to one another in series.

Moreover, in the fuel cell according to the present invention, the cell block internal fuel gas channel and the cell block internal oxidizing gas channel may be formed to realize parallel flow.

Moreover, the fuel cell according to the present invention may further include: a fuel gas connecting channel connecting the cell block internal fuel gas channel of one of the cell blocks and the cell block internal fuel gas channel of the other cell block in series; and an oxidizing gas connecting channel connecting the cell block internal oxidizing gas channel of one of the cell blocks and the cell block internal oxidizing gas channel of the other cell block in series.

Moreover, in the fuel cell according to the present invention, the cooling medium upstream cell block may be located upstream of the fuel gas connecting channel and upstream of the oxidizing gas connecting channel, and the cooling medium downstream cell block may be located downstream of the fuel gas connecting channel and downstream of the oxidizing gas connecting channel.

Moreover, the fuel cell according to the present invention may further include: a fuel gas connecting channel connecting the cell block internal fuel gas channel of one of the cell blocks and the cell block internal fuel gas channel of the other cell block in parallel; and an oxidizing gas connecting channel connecting the cell block internal oxidizing gas channel of one of the cell blocks and the cell block internal oxidizing gas channel of the other cell block in parallel.

Moreover, in the fuel cell according to the present invention, a connecting plate may be disposed between one of the cell blocks and the other cell block, and the cooling medium connecting channel may be formed on the connecting plate.

Further, in the fuel cell according to the present invention, the plurality of cell blocks may be at least two cell blocks disposed next to each other.

Moreover, a fuel cell system according to the present invention includes: the fuel cell; a fuel gas supplying device configured to supply the fuel gas to the fuel cell; an oxidizing gas supplying device configured to supply the oxidizing gas to the fuel cell; a temperature controller configured to control a temperature of the fuel cell; an electric power adjuster configured to adjust electric power obtained from the fuel cell; and a controller configured to control the fuel gas supplying device, the oxidizing gas supplying device, the temperature controller, and the electric power adjuster, wherein the controller is configured to carry out an electric power generating operation under such conditions that a relative humidity of the fuel gas flowing through the cell block internal fuel gas channel of the cooling medium downstream cell block is lower than that of the fuel gas flowing through the cell block internal fuel gas channel of the cooling medium upstream cell block and a relative humidity of the oxidizing gas flowing through the cell block internal oxidizing gas channel of the cooling medium downstream cell block is lower than that of the oxidizing gas flowing through the cell block internal oxidizing gas channel of the cooling medium upstream cell block.

With this, the cooling medium discharged from the fuel cell (from the cell block internal cooling medium channel of the cell block located at an extreme downstream side) can be easily increased in temperature, and the power generation efficiency of the entire fuel cell can be improved.

Further, in the fuel cell system according to the present invention, the controller may be configured to carry out the electric power generating operation under such a condition that a dew point of each of the fuel gas and the oxidizing gas supplied to the fuel cell is lower than a temperature of the cooling medium supplied to the fuel cell.

Moreover, a method for operating a fuel cell according to the present invention is a method for operating a fuel cell, the fuel cell including: a plurality of cell blocks, each of which is formed by stacking cells each including a pair of electrodes and a polymer electrolyte layer sandwiched between the pair of electrodes; a cell block internal fuel gas channel which penetrates each of the cell blocks and through which a fuel gas flows so as to flow through the cells of the cell block; a cell block internal oxidizing gas channel which penetrates each of the cell blocks and through which an oxidizing gas flows so as to flow through the cells of the cell block; a cell block internal cooling medium channel which penetrates each of the cell blocks and through which a cooling medium flows so as to flow through the cells of the cell block; and a cooling medium connecting channel connecting the cell block internal cooling medium channel of one of the cell blocks and the cell block internal cooling medium channel of the other cell block in series, wherein: the catalyst layer includes a catalyst support and a polymer electrolyte adhered to the catalyst support, the catalyst support containing an electrode catalyst and carbon powder supporting the electrode catalyst; the catalyst layer in the cell of the cell block (hereinafter referred to as "cooling medium downstream cell block") located downstream of the cooling medium connecting channel is higher or larger in at least one selected from the group consisting of a density of an ion exchange group per unit volume of the catalyst layer, an electrode catalyst supporting amount of the catalyst support of the catalyst layer, and a catalyst supporting rate of the catalyst layer, than the catalyst layer in the cell of the cell block (hereinafter referred to as "cooling medium upstream cell block") located upstream of the cooling medium connecting channel; and the fuel cell carries out an electric power generating operation under such conditions that a relative humidity of the fuel gas flowing through the cell block internal fuel gas channel of the cooling medium downstream cell block is lower than that of the fuel gas flowing through the cell block internal fuel gas channel of the cooling medium upstream cell block and a relative humidity of the oxidizing gas flowing through the cell block internal oxidizing gas channel of the cooling medium downstream cell block is lower than that of the oxidizing gas flowing through the cell block internal oxidizing gas channel of the cooling medium upstream cell block.

With this, the cooling medium discharged from the fuel cell (from the cell block internal cooling medium channel of the cell block located at an extreme downstream side) can be easily increased in temperature, and the power generation efficiency of the entire fuel cell can be improved.

Further, in the method for operating the fuel cell according to the present invention, the fuel cell may carry out the electric power generating operation under such a condition that a dew point of each of the fuel gas and the oxidizing gas supplied to the fuel cell is lower than a temperature of the cooling medium supplied to the fuel cell.

The above object, other objects, features and advantages of the present invention will be made clear by the following detailed explanation of preferred embodiments with reference to the attached drawings.

Advantageous Effects of Invention

In accordance with the fuel cell of the present invention, the fuel cell system including the fuel cell, and the method for operating the fuel cell, the cooling medium discharged from the fuel cell (from the internal cooling medium channel of the cell block located at the extreme downstream side) can be easily increased in temperature, and the power generation efficiency of the entire fuel cell can be improved.

DESCRIPTION OF EMBODIMENTS

Figure 1:
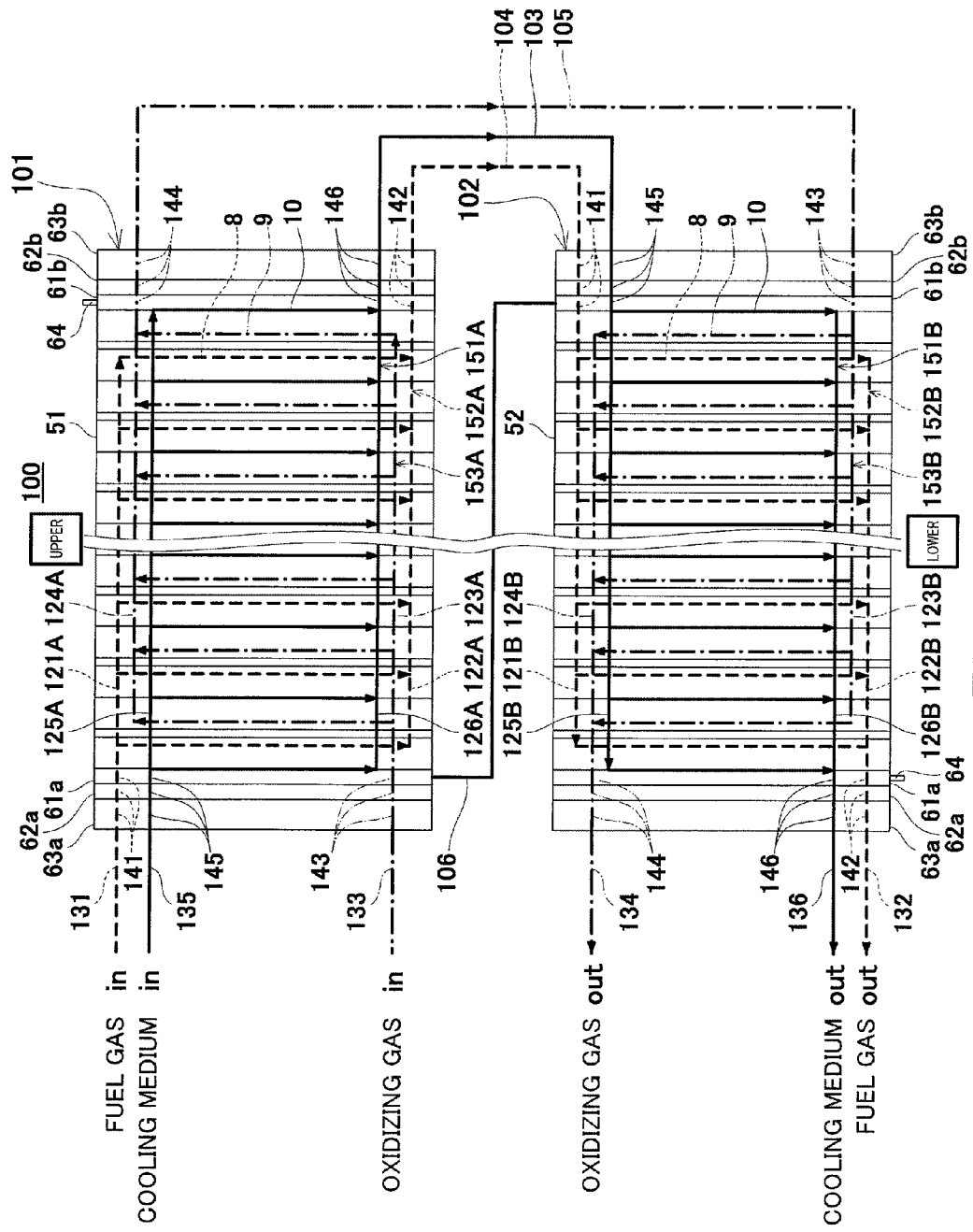
FIG. 1 is a schematic diagram showing a schematic configuration of a fuel cell according to Embodiment 1 of the present invention.

Hereinafter, preferred embodiments of the present invention will be explained in reference to the drawings. In the drawings, the same reference signs are used for the same or corresponding components, and a repetition of the same explanation is avoided. Moreover, in the drawings, only a component or components necessary for explaining the present invention are shown, and the other components are omitted. Further, the present invention is not limited to the following embodiments.

Embodiment 1

Configuration of Fuel Cell

FIG. 1 is a schematic diagram showing a schematic configuration of a fuel cell according to Embodiment 1 of the present invention. In FIG. 1, a vertical direction of the fuel cell is shown as a vertical direction of the drawing, and a part of the fuel cell is omitted.

As shown in FIG. 1, a fuel cell 100 according to Embodiment 1 of the present invention includes a first cell block 101 formed by stacking one or more first cells 51 and a second cell block 102 formed by stacking one or more second cells 52. Two cell blocks that are the first cell block 101 and the second cell block 102 are disposed next to each other. A first current collector 61a, a first insulating plate 62a, and a first end plate 63a are disposed on one end of each of the first cell block 101 and the second cell block 102, and a second current collector 61b, a second insulating plate 62b, and a second end plate 63b are disposed on the other end of each of the first cell block 101 and the second cell block 102. An electric wire 106 is disposed to connect the first current collector 61a of the first cell block 101 and the second current collector 61b of the second cell block 102 in series. With this, the first cell block 101 and the second cell block 102 are electrically connected to each other in series.

Each of the second current collector 61b of the first cell block 101 and the first current collector 61a of the second cell block 102 is provided with a terminal 64. One end of an electric wire (not shown) is connected to the terminal 64, and the other end thereof is connected to an inverter (not shown in FIG. 1). With this, a direct current generated in the fuel cell 100 is output to the inverter, and the inverter converts the direct current into an alternating current. Thus, the electric power is supplied to an electric power load.

The fuel cell 100 includes a cooling medium connecting channel 103, a fuel gas connecting channel 104, and an oxidizing gas connecting channel 105. The cooling medium connecting channel 103 connects a cell block internal cooling medium channel 151A of the first cell block 101 and a cell block internal cooling medium channel 151B of the second cell block 102 in series. The fuel gas connecting channel 104 connects a cell block internal fuel gas channel 152A of the first cell block 101 and a cell block internal fuel gas channel 152B of the second cell block 102 in series. The oxidizing gas connecting channel 105 connects a cell block internal oxidizing gas channel 153A of the first cell block 101 and a cell block internal oxidizing gas channel 153B of the second cell block 102 in series.

Here, the cell block internal cooling medium channel 151A of the first cell block 101 is a channel which penetrates the first cell block 101 and through which a cooling medium flows to the first cells 51 of the first cell block 101. The cell block internal cooling medium channel 151A includes a cooling medium supplying manifold 125A, cooling medium channels 10 of all the first cells 51, and a cooling medium discharging manifold 126A. Moreover, the cell block internal fuel gas channel 152A of the first cell block 101 is a channel which penetrates the first cell block 101 and through which a fuel gas flows to the first cells 51 of the first cell block 101. The cell block internal fuel gas channel 152A includes a fuel gas supplying manifold 121A, fuel gas channels 8 of all the first cells 51, and a fuel gas discharging manifold 122A.

Further, the cell block internal oxidizing gas channel 153A of the first cell block 101 is a channel which penetrates the first cell block 101 and through which an oxidizing gas flows to the first cells 51 of the first cell block 101. The cell block internal oxidizing gas channel 153A includes an oxidizing gas supplying manifold 123A, oxidizing gas channels 9 of all the first cells 51, and an oxidizing gas discharging manifold 124A.

The cell block internal cooling medium channel 151B of the second cell block 102 is a channel which penetrates the second cell block 102 and through which the cooling medium flows to the second cells 52 of the second cell block 102. The cell block internal cooling medium channel 151B includes a cooling medium supplying manifold 125B, the cooling medium channels 10 of the second cell 52, and a cooling medium discharging manifold 126B. Moreover, the cell block internal fuel gas channel 152B of the second cell block 102 is a channel which penetrates the second cell block 102 and through which the fuel gas flows to the second cells 52 of the second cell block 102. The cell block internal fuel gas channel 152B includes a fuel gas supplying manifold 121B, the fuel gas channels 8 of the second cell 52, and a fuel gas discharging manifold 122B. Further, the cell block internal oxidizing gas channel 153B of the second cell block 102 is a channel which penetrates the second cell block 102 and through which the oxidizing gas flows to the second cells 52 of the second cell block 102. The cell block internal oxidizing gas channel 153B includes an oxidizing gas supplying manifold 123B, the oxidizing gas channels 9 of the second cell 52, and an oxidizing gas discharging manifold 124B.

In Embodiment 1, the cell block internal fuel gas channel 152A of the first cell block 101 and the cell block internal fuel gas channel 152B of the second cell block 102 are connected to each other in series. However, the present embodiment is not limited to this. The cell block internal fuel gas channel 152A of the first cell block 101 and the cell block internal fuel gas channel 152B of the second cell block 102 may be connected to each other in parallel. Moreover, the cell block internal oxidizing gas channel 153A of the first cell block 101 and the cell block internal oxidizing gas channel 153B of the second cell block 102 are connected to each other in series. However, the present embodiment is not limited to this. The cell block internal oxidizing gas channel 153A of the first cell block 101 and the cell block internal oxidizing gas channel 153B of the second cell block 102 may be connected to each other in parallel. Here, in the present invention, connecting two channels in series denotes that a downstream end (exit) of one channel and an upstream end (entrance) of the other channel are connected to each other. Moreover, in the present invention, connecting two channels in parallel denotes that the upstream end (entrance) of one channel and the upstream end (entrance) of the other channel are connected to each other.

Figure 2:
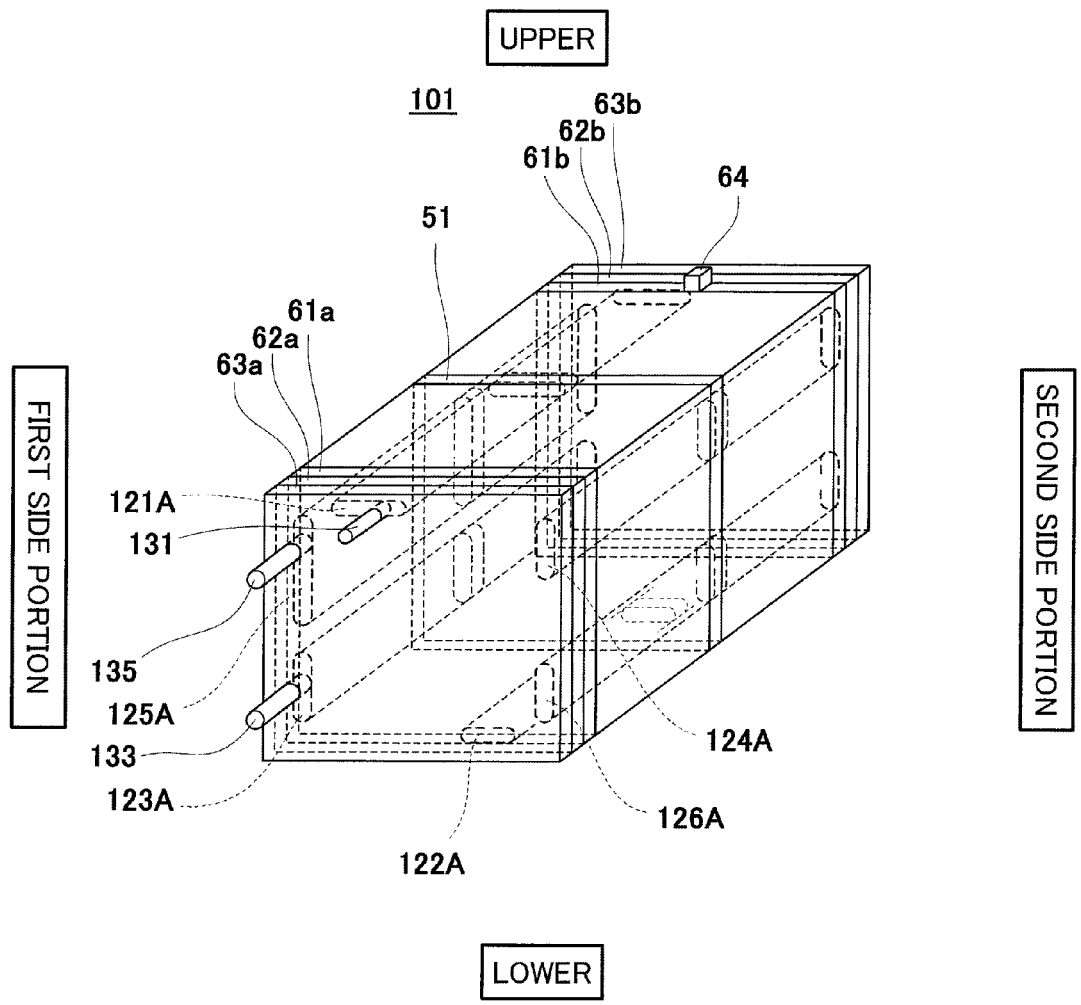
FIG. 2 is a perspective view schematically showing a schematic configuration of a first cell stack of the fuel cell shown in FIG. 1.

Next, the configuration of the first cell block 101 will be explained in more detail in reference to FIGS. 1 and 2. FIG. 2 is a perspective view schematically showing a schematic configuration of the first cell block 101 of the fuel cell 100 shown in FIG. 1. In FIG. 2, a vertical direction of the first cell block 101 is shown as a vertical direction of the drawing.

As shown in FIGS. 1 and 2, the first cell block 101 is formed by stacking the first cells 51 each having a plate shape in a thickness direction of the first cell 51. The first and second current collectors 61a and 61b, the first and second insulating plates 62a and 62b, the first and second end plates 63a and 63b, and fastening members (not shown) fastening the first cell block 101 in the stack direction of the first cell 51 are disposed on both ends of the first cell block 101. Specifically, the first and second current collectors 61a and 61b are disposed to respectively contact both ends of the first cell block 101, and the first end plate 63a and the second end plate 63b are respectively located at outermost portions of the first cell block 101. Moreover, the first insulating plate 62a is disposed between the first current collector 61a and the first end plate 63a, and the second insulating plate 62b is disposed between the second current collector 61b and the second end plate 63b. The first cell 51 having the plate shape extends in parallel with a vertical surface, and the stack direction of the first cell 51 is a horizontal direction.

The cooling medium supplying manifold 125A is formed at an upper portion of one side portion (side portion on the left side of the drawing; hereinafter referred to as a "first side portion") of the first cell block 101 so as to penetrate in the stack direction of the first cell 51 of the first cell block 101. One end of the cooling medium supplying manifold 125A is communicated with through holes 145 formed on the first current collector 61a, the first insulating plate 62a, and the first end plate 63a, and a cooling medium supplying passage 135 (to be precise, a pipe constituting the cooling medium supplying passage 135) is connected to the through holes 145. The other end of the cooling medium supplying manifold 125A is closed by the second current collector 61b.

Moreover, the oxidizing gas supplying manifold 123A is formed under the cooling medium supplying manifold 125A so as to penetrate in the stack direction of the first cell 51 of the first cell block 101. One end of the oxidizing gas supplying manifold 123A is communicated with through holes 143 formed on the first current collector 61a, the first insulating plate 62a, and the first end plate 63a, and an oxidizing gas supplying passage 133 (to be precise, a pipe constituting the oxidizing gas supplying passage 133) is connected to the through holes 143. The other end of the oxidizing gas supplying manifold 123A is closed by the second current collector 61b.

Further, the fuel gas supplying manifold 121A is formed on an upper inner side of the cooling medium supplying manifold 125A so as to penetrate in the stack direction of the first cell 51 of the first cell block 101. One end of the fuel gas supplying manifold 121A is communicated with through holes 141 formed on the first current collector 61a, the first insulating plate 62a, and the first end plate 63a, and a fuel gas supplying passage 131 (to be precise, a pipe constituting the fuel gas supplying passage 131) is connected to the through holes 141. The other end of the fuel gas supplying manifold 121A is closed by the second current collector 61b.

Moreover, the cooling medium discharging manifold 126A is formed at a lower portion of the other side portion (side portion on the right side of the drawing; hereinafter referred to as a "second side portion") of the first cell block 101 so as to penetrate in the stack direction of the first cell 51 of the first cell block 101. One end (exit) of the cooling medium discharging manifold 126A is communicated with through holes 146 formed on the second current collector 61b, the second insulating plate 62b, and the second end plate 63b, and the cooling medium connecting channel 103 (to be precise, a pipe constituting the cooling medium connecting channel 103) is connected to the through holes 146. The other end of the cooling medium discharging manifold 126A is closed by the first current collector 61a.

Moreover, the oxidizing gas discharging manifold 124A is formed above the cooling medium discharging manifold 126A so as to penetrate in the stack direction of the first cell 51 of the first cell block 101. One end (exit) of the oxidizing gas discharging manifold 124A is communicated with the through holes 146 formed on the second current collector 61b, the second insulating plate 62b, and the second end plate 63b, and the oxidizing gas connecting channel 105 (to be precise, a pipe constituting the oxidizing gas connecting channel 105) is connected to the through holes 146. The other end of the oxidizing gas discharging manifold 124A is closed by the first current collector 61a.

Further, the fuel gas discharging manifold 122A is formed on a lower inner side of the cooling medium discharging manifold 126A so as to penetrate in the stack direction of the first cell 51 of the first cell block 101. One end (exit) of the fuel gas discharging manifold 122A is communicated with through holes 142 formed on the second current collector 61b, the second insulating plate 62b, and the second end plate 63b, and the fuel gas connecting channel 104 (to be precise, a pipe constituting the fuel gas connecting channel 104) is connected to the through holes 142. The other end of the fuel gas discharging manifold 122A is closed by the first current collector 61a.

Next, the configuration of the second cell block 102 will be explained in more detail in reference to FIGS. 1 and 3. Since the second cell block 102 is the same in basic configuration as the first cell block 101, only differences therebetween will be explained.

Figure 3:
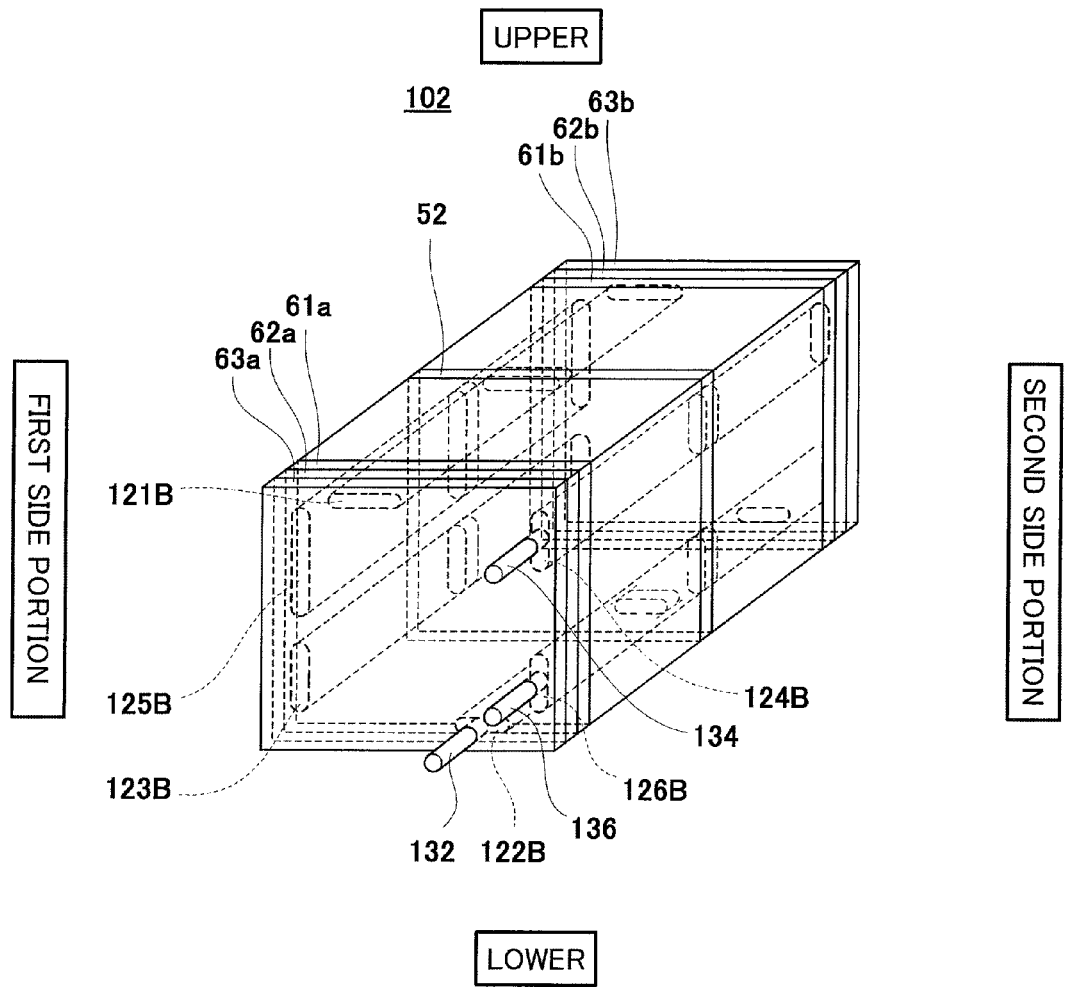
FIG. 3 is a perspective view schematically showing a schematic configuration of a second cell stack of the fuel cell shown in FIG. 1.

FIG. 3 is a perspective view schematically showing a schematic configuration of the second cell block 102 of the fuel cell 100 shown in FIG. 1. In FIG. 3, a vertical direction of the second cell block 102 is shown as a vertical direction of the drawing.

As shown in FIGS. 1 and 3, one end of the fuel gas supplying manifold 121B of the second cell block 102 is closed by the first current collector 61a, the other end (entrance) thereof is communicated with the through holes 141 formed on the second current collector 61b, the second insulating plate 62b, and the second end plate 63b, and the fuel gas connecting channel 104 (to be precise, a pipe constituting the fuel gas connecting channel 104) is connected to the through holes 141. Moreover, one end of the fuel gas discharging manifold 122B of the second cell block 102 is communicated with the through holes 142 formed on the first current collector 61a, the first insulating plate 62a, and the first end plate 63a, and a fuel gas discharging passage 132 (to be precise, a pipe constituting the fuel gas discharging passage 132) is connected to the through holes 142. The other end of the fuel gas discharging manifold 122B of the second cell block 102 is closed by the second current collector 61b.

Moreover, one end of the oxidizing gas supplying manifold 123B of the second cell block 102 is closed by the first current collector 61a, the other end (entrance) thereof is communicated with the through holes 143 formed on the second current collector 61b, the second insulating plate 62b, and the second end plate 63b, and the oxidizing gas connecting channel 105 (to be precise, a pipe constituting the oxidizing gas connecting channel 105) is connected to the through holes 143. Moreover, one end of the oxidizing gas discharging manifold 124B of the second cell block 102 is communicated with through holes 144 formed on the first current collector 61a, the first insulating plate 62a, and the first end plate 63a, and an oxidizing gas discharging passage 134 (to be precise, a pipe constituting the oxidizing gas discharging passage 134) is connected to the through holes 144. The other end of the oxidizing gas discharging manifold 124B of the second cell block 102 is closed by the second current collector 61b.

Further, one end of the cooling medium supplying manifold 125B of the second cell block 102 is closed by the first current collector 61a, the other end (entrance) thereof is communicated with through holes 145 formed on the second current collector 61b, the second insulating plate 62b, and the second end plate 63b, and the cooling medium connecting channel 103 (to be precise, a pipe constituting the cooling medium connecting channel 103) is connected to the through holes 145. Moreover, one end of the cooling medium discharging manifold 126B of the second cell block 102 is communicated with the through holes 146 formed on the first current collector 61a, the first insulating plate 62a, and the first end plate 63a, and a cooling medium discharging passage 136 (to be precise, a pipe constituting the cooling medium discharging passage 136) is connected to the through holes 146. The other end of the cooling medium discharging manifold 126B of the second cell block 102 is closed by the second current collector 61b.

With this, the fuel gas and the oxidizing gas having flowed through the first cell block 101 respectively flow through the fuel gas connecting channel 104 and the oxidizing gas connecting channel 105 to be supplied to the second cell block 102.

Moreover, the cooling medium having supplied to the first cell block 101 flows through the cooling medium connecting channel 103 to be supplied to the second cell block 102. To be specific, the first cell block 101 is located upstream of the cooling medium connecting channel 103 and constitutes a cooling medium upstream cell block, and the second cell block 102 is located downstream of the cooling medium connecting channel 103 and constitutes a cooling medium downstream cell block.

Since the cooling medium flowing through the first cell block 101 is heated by recovering the heat generated by the reaction between the fuel gas and the oxidizing gas in each of the first cells 51 of the first cell block 101, the second cell block 102 becomes higher in temperature than the first cell block 101. Therefore, the cooling medium discharged from the second cell block 102 can be easily increased in temperature. In the present embodiment, since the inside of the second cell block 102 becomes higher in temperature than that of the first cell block 101, the second cell block 102 becomes lower in relative humidity than the first cell block 101.

Next, the configuration of the first cell 51 constituting the first cell block 101 and the configuration of the second cell 52 constituting the second cell block 102 will be explained in detail in reference to FIG. 4. The first cell 51 and the second cell 52 are the same in basic configuration as each other. Therefore, when explaining the second cell 52, only differences between the second cell 52 and the first cell 51 will be explained.

Figure 4:
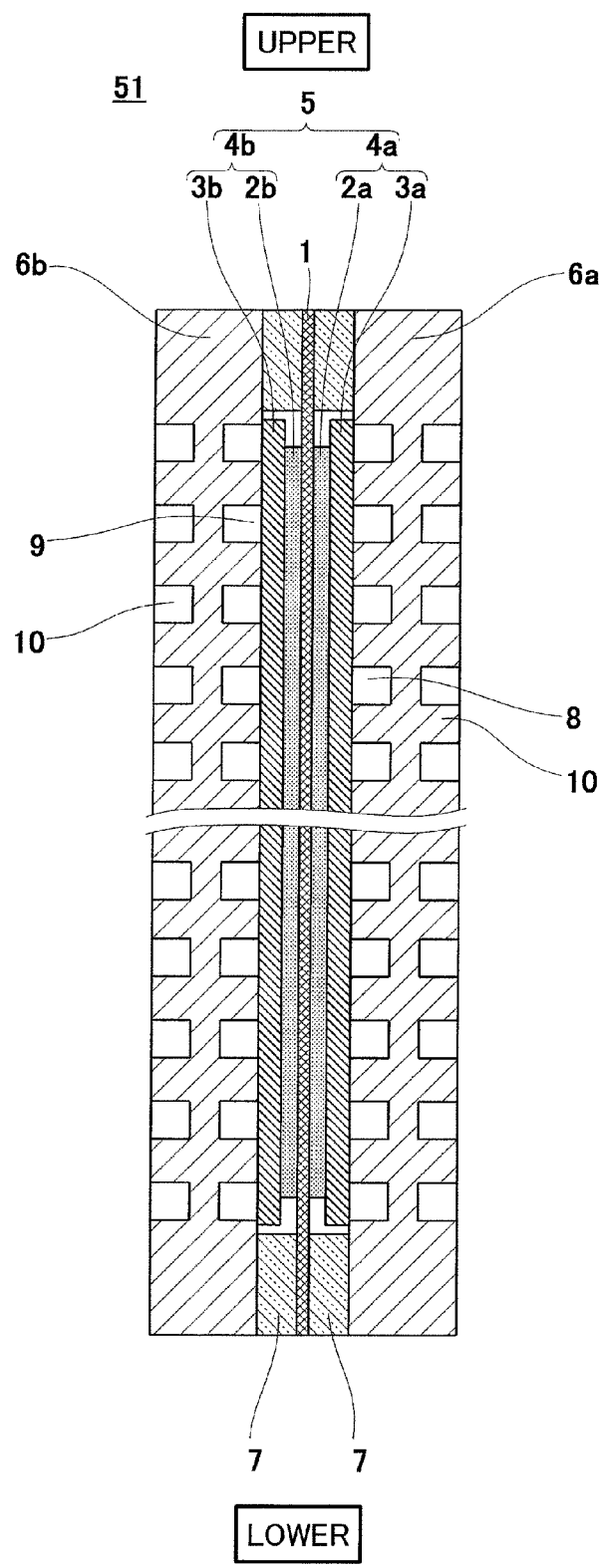
FIG. 4 is a cross-sectional view schematically showing a schematic configuration of a first cell of the fuel cell shown in FIG. 1.

FIG. 4 is a cross-sectional view schematically showing a schematic configuration of the first cell 51 of the fuel cell 100 shown in FIG. 1.

As shown in FIG. 4, the first cell 51 includes an MEA (Membrane Electrode Assembly (polymer electrolyte layer-electrode assembly)) 5, gaskets 7, an anode separator 6a, and a cathode separator 6b.

First, the MEA 5 will be explained.

The MEA 5 includes a polymer electrolyte membrane (polymer electrolyte layer) 1 which selectively transports hydrogen ions, an anode electrode 4a, and a cathode electrode 4b. The polymer electrolyte membrane 1 has a substantially quadrangular shape (herein, rectangular shape). The anode electrode 4a and the cathode electrode 4b are respectively disposed on both surfaces of the polymer electrolyte membrane 1 such that each of the anode electrode 4a and the cathode electrode 4b is located on not a peripheral portion of the surface thereof but an inner region of the surface thereof. Manifold holes (not shown), such as an oxidizing gas discharging manifold hole, are formed at the peripheral portion of the polymer electrolyte membrane 1 so as to penetrate the polymer electrolyte membrane 1 in a thickness direction thereof.

The anode electrode 4a includes an anode catalyst layer 2a and an anode gas diffusion layer 3a. The anode catalyst layer 2a is disposed on one of main surfaces of the polymer electrolyte membrane 1 and contains catalyst supporting carbon (catalyst support) made of carbon powder (electrically-conductive carbon particles) supporting platinum-based metal catalysts (electrode catalysts) and polymer electrolyte adhered to the catalyst supporting carbon. The anode gas diffusion layer 3a is disposed on the anode catalyst layer 2a and has both gas permeability and electrical conductivity. Similarly, the cathode electrode 4b includes a cathode catalyst layer 2b and a cathode gas diffusion layer 3b. The cathode catalyst layer 2b is disposed on the other main surface of the polymer electrolyte membrane 1 and contains catalyst supporting carbon (catalyst support) made of carbon powder (electrically-conductive carbon particles) supporting the platinum-based metal catalysts (electrode catalysts) and polymer electrolyte adhered to the catalyst supporting carbon. The cathode gas diffusion layer 3b is disposed on the cathode catalyst layer 2b and has both the gas permeability and the electrical conductivity.

Next, respective components of the MEA 5 will be explained.

The polymer electrolyte membrane 1 has proton conductivity. It is preferable that the polymer electrolyte membrane 1 contain as a positive ion exchange group, a sulfonic acid group, a carboxylic acid group, a phosphonic acid group, and a sulfonimide group. In light of the proton conductivity, it is preferable that the polymer electrolyte membrane 1 contain the sulfonic acid group.

As a resin which constitutes the polymer electrolyte membrane 1 and contains the sulfonic acid group, a dry resin having an ion exchange capacity of 0.5 to 2.0 meq/g is preferable. It is preferable that the ion exchange capacity of the dry resin constituting the polymer electrolyte membrane 1 be 0.5 meq/g or more, since the increase in resistance value of the polymer electrolyte membrane 1 during the electric power generation can be adequately reduced. Moreover, it is preferable that the ion exchange capacity of the dry resin be 2.0 meq/g or less, since a water content of the polymer electrolyte membrane does not increase, the polymer electrolyte membrane is less likely to swell, and fine holes of the anode catalyst layer 2a and the cathode catalyst layer 2b are unlikely to clog.

It is preferable that the polymer electrolyte be a copolymer containing a polymerization unit based on a perfluorovinyl compound expressed by $CF_2=CF—(OCF_2CFX)_m—O_p—(CF_2)_n—SO_3H$ (m is an integer from 0 to 3, n is an integer from 1 to 12, p is 0 or 1, and X is a fluorine atom or a trifluoromethyl group), and a polymerization unit based on tetrafluoroethylene.

Preferable examples of the above fluorovinyl compound are compounds expressed by Formulas (1) to (3) below. In the following formulas, q is an integer from 1 to 8, r is an integer from 1 to 8, and t is an integer from 1 to 3.

$$CF_2=CFO(CF_2)_q—SO_3H \tag{1}$$

$$CF_2=CFOCF_2CF(CF_3)O(CF_2)_r—SO_3H \tag{2}$$

$$CF_2=CF(OCF_2CF(CF_3))_tO(CF_2)_2—SO_3H \tag{3}$$

The anode catalyst layer 2a and the cathode catalyst layer 2b are not especially limited as long as the effects of the present invention can be obtained. Each of the anode catalyst layer 2a and the cathode catalyst layer 2b may have the same configuration as a catalyst layer of a gas diffusion electrode of a known fuel cell. For example, each of the anode catalyst layer 2a and the cathode catalyst layer 2b may further contain a water-repellent material, such as polytetrafluoroethylene, in addition to the catalyst supporting carbon made of the carbon powder (electrically-conductive carbon particles) supporting the electrode catalyst and the polymer electrolyte adhered to the catalyst supporting carbon. Moreover, the anode catalyst layer 2a and the cathode catalyst layer 2b may be the same in configuration as each other or may be different in configuration from each other.

It is preferable that the carbon powder used as the catalyst carrier have a specific surface area of from 50 to 2,000 $m^2/g$. It is preferable that the specific surface area of the carbon powder be 50 $m^2/g$ or more, since the carbon powder can easily and highly dispersively support the electrode catalyst, and even if the relative humidity is low, a space for holding moisture becomes large, and the anode catalyst layer 2a and the cathode catalyst layer 2b can be prevented from drying. Moreover, it is preferable that the specific surface area of the carbon powder be 2,000 $m^2/g$ or less, since an oxidation resistance of the carbon powder can be easily secured, and even if the carbon powder is subjected to a high potential, erosion of the carbon powder can be prevented.

Moreover, metal particles can be used as the electrode catalyst. The metal particle is not especially limited, and various metals can be used. In light of an electrode reaction activity, it is preferable that the metal particle be at least one metal selected from the group consisting of platinum, gold, silver, ruthenium, rhodium, palladium, osmium, iridium, chromium, iron, titanium, manganese, cobalt, nickel, molybdenum, tungsten, aluminum, silicon, zinc, and tin. Among these metals, platinum or an alloy of platinum and at least one selected from the above group is preferable. An alloy of platinum and ruthenium is especially preferable since the activity of the catalyst in the anode catalyst layer 2a becomes stable.

Moreover, it is preferable that an electrode catalyst supporting rate of the catalyst supporting carbon used in the anode catalyst layer 2a and the cathode catalyst layer 2b be in a range from 10 to 90 wt %. It is preferable that the catalyst supporting rate be 10 wt % or more, since the thickness of the anode catalyst layer 2a and/or the thickness of the cathode catalyst layer 2b with respect to a predetermined amount of electrode catalyst can be reduced, and ionic conductivity, gas diffusivity, and a water discharge property of the anode catalyst layer 2a and/or ionic conductivity, gas diffusivity, and a water discharge property of the cathode catalyst layer 2b can be improved. Moreover, it is preferable that the catalyst supporting rate be 90 wt %, since the catalyst supporting carbon can easily and highly dispersively support the electrode catalyst, and high power generation efficiency can be obtained.

Moreover, the first cell block 101 is high in relative humidity. Therefore, in order to obtain high power generation efficiency, it is effective to highly dispersively support the electrode catalyst. In contrast, the second cell block 102 is low in relative humidity. Therefore, in order to obtain high power generation efficiency, it is effective to improve the ion conductivity of each of the anode catalyst layer 2a and the cathode catalyst layer 2b. Therefore, in order to reduce the cost of the fuel cell 100 and increase the power generation efficiency of the fuel cell 100, the electrode catalyst supporting rate of the catalyst supporting carbon used in at least one of the anode catalyst layer 2a and the cathode catalyst layer 2b of the second cell 52 is set to be higher than the electrode catalyst supporting rate of the catalyst supporting carbon used in the anode catalyst layer 2a and the cathode catalyst layer 2b of the first cell 51.

Moreover, it is preferable that an electrode catalyst supporting amount of the catalyst supporting carbon used in the anode catalyst layer 2a and the cathode catalyst layer 2b be from 0.01 to 10 $mg/cm^2$. It is preferable that the electrode catalyst supporting amount be 0.01 $mg/cm^2$ or more, since a reaction overvoltage of the electrochemical reaction can be reduced. Moreover, it is preferable that the electrode catalyst supporting amount be 10 $mg/cm^2$ or less, since the cost for the electrode catalyst can be reduced.

Moreover, the first cell block 101 is high in relative humidity. Therefore, even in a case where the amount of electrode catalyst is small, high power generation efficiency can be obtained. In contrast, the second cell block 102 is low in relative humidity. Therefore, the amount of electrode catalyst significantly affect the power generation efficiency, and an effect of reducing the reaction overvoltage is significant in a case where the relative humidity of the anode catalyst layer 2a and/or the relative humidity of the cathode catalyst layer 2b are low. Therefore, in order to reduce the cost of the fuel cell 100 and increase the power generation efficiency of the fuel cell 100, the electrode catalyst supporting amount of the catalyst supporting carbon used in at least one of the anode catalyst layer 2a and the cathode catalyst layer 2b of the second cell 52 is set to be larger than the electrode catalyst supporting amount of the catalyst supporting carbon used in the anode catalyst layer 2a and the cathode catalyst layer 2b of the first cell 51.

Moreover, the polymer electrolyte used in the anode catalyst layer 2a and the cathode catalyst layer 2b may be the same as or different from the material constituting the above-described polymer electrolyte membrane 1. It is preferable that the polymer electrolyte used in the anode catalyst layer 2a and the cathode catalyst layer 2b be the dry resin having the ion exchange capacity of 0.5 to 2.0 meq/g. It is preferable that the dry resin (polymer electrolyte) constituting the polymer electrolyte have the ion exchange capacity of 0.5 meq/g or more, since the ion conductivity of the catalyst layer can be improved, and even if the relative humidity is low, the water content becomes high, and the catalyst layer can be prevented from drying. Moreover, it is preferable that the dry resin have the ion exchange capacity of 2.0 meq/g or less, since the swelling of the polymer electrolyte by water can be suppressed, and the gas diffusion is unlikely to be disturbed by clogging the fine holes of the catalyst layer.

Moreover, the first cell block 101 is high in relative humidity, and the fine holes of the catalyst layer tend to be clogged by the swelling of the polymer electrolyte and generated water. In contrast, the second cell block 102 is low in relative humidity, the catalyst layer dries, and the ion conductivity of the catalyst layer tends to deteriorate. Therefore, in order to reduce the cost of the fuel cell 100 and increase the power generation efficiency of the fuel cell 100, the ion exchange capacity of the polymer electrolyte used in at least one of the anode catalyst layer 2a and the cathode catalyst layer 2b of the second cell 52 is set to be larger than the ion exchange capacity of the polymer electrolyte used in the anode catalyst layer 2a and the cathode catalyst layer 2b of the first cell 51.

To be specific, the density of the ion exchange group per unit volume of at least one of the anode catalyst layer 2a and the cathode catalyst layer 2b of the second cell 52 is higher than the density of the ion exchange group per unit volume of at least one of the anode catalyst layer 2a and the cathode catalyst layer 2b of the first cell 51.

Moreover, it is preferable that the amount of polymer electrolyte used in the anode catalyst layer 2a and the cathode catalyst layer 2b be adjusted such that a ratio (WP/WCat-C) of a mass WP of the polymer electrolyte to a mass WCat-C of the catalyst supporting carbon contained in the anode catalyst layer 2a or the cathode catalyst layer 2b is from 0.3 to 3.0. It is preferable that the ratio WP/WCat-C be 0.3 or more, since an ion conduction passage is effectively formed in the catalyst layer, and the ion conductivity of each of the anode catalyst layer 2a and the cathode catalyst layer 2b improves. Moreover, it is preferable that the ratio WP/WCat-C be 3.0 or less, since a gas diffusion passage is effectively formed in the anode catalyst layer 2a and the cathode catalyst layer 2b, and the gas diffusivity of each of the anode catalyst layer 2a and the cathode catalyst layer 2b improves.

Moreover, since the first cell block 101 is high in relative humidity, the gas diffusivity of each of the anode catalyst layer 2a and the cathode catalyst layer 2b tends to deteriorate by the swelling of the polymer electrolyte and the generated water. In contrast, since the second cell block 102 is low in relative humidity, the anode catalyst layer 2a and the cathode catalyst layer 2b dry, and the ion conductivity of each of the anode catalyst layer 2a and the cathode catalyst layer 2b tends to deteriorate. Therefore, in order to reduce the cost of the fuel cell 100 and increase the power generation efficiency of the fuel cell 100, the ratio (WP/WCat-C) of the mass WP of the polymer electrolyte to the mass WCat-C of the catalyst supporting carbon used in at least one of the anode catalyst layer 2a and the cathode catalyst layer 2b of the second cell 52 is set to be higher than the ratio (WP/WCat-C) of the mass WP of the polymer electrolyte to the mass WCat-C of the catalyst supporting carbon used in the anode catalyst layer 2a and the cathode catalyst layer 2b of the first cell 51.

To be specific, the density of the ion exchange group per unit volume of at least one of the anode catalyst layer 2a and the cathode catalyst layer 2b of the second cell 52 is set to be higher than the density of the ion exchange group per unit volume of at least one of the anode catalyst layer 2a and the cathode catalyst layer 2b of the first cell 51.

For example, as each of the anode gas diffusion layer 3a and the cathode gas diffusion layer 3b, an electrically-conductive base material may be used, which is manufactured using high-surface-area carbon fine powder, pore-forming material, carbon paper, carbon cloth, or the like and has a porous structure in order that each of the anode gas diffusion layer 3a and the cathode gas diffusion layer 3b obtains the gas permeability. Moreover, in order to obtain an adequate drainage property, water-repellent polymer, such as a fluorocarbon resin, or the like may be dispersed in the anode gas diffusion layer 3a or the cathode gas diffusion layer 3b. Further, in order to obtain adequate electron conductivity, the anode gas diffusion layer 3a or the cathode gas diffusion layer 3b may be formed by an electronically-conductive material, such as carbon fiber, metal fiber, or carbon fine powder.

Moreover, a water-repellent carbon layer constituted by water-repellent polymer and carbon powder be formed between the anode gas diffusion layer 3a and the anode catalyst layer 2a and between the cathode gas diffusion layer 3b and the cathode catalyst layer 2b. With this, water control (retention of water necessary for maintaining satisfactory properties of the MEA 5, and quick discharge of unnecessary water) of the MEA 5 can be carried out more easily and more surely.

Next, the other components of the first cell 51 will be explained.

A pair of doughnut-shaped gaskets 7 made of fluorocarbon rubber are respectively disposed around the anode electrode 4a and the cathode electrode 4b (to be precise, the anode gas diffusion layer 3a and the cathode gas diffusion layer 3b) of the MEA 5 so as to sandwich the polymer electrolyte membrane 1. This prevents the fuel gas and the oxidizing gas from leaking to an outside of the cell and also prevents these gases from being mixed with each other in the fuel cell 100. Manifold holes (not shown), such as the oxidizing gas discharging manifold hole, which are through holes extending in a thickness direction are formed at a peripheral portion of the gasket 7.

Moreover, the electrically-conductive anode separator 6a and the electrically-conductive cathode separator 6b are disposed to sandwich the MEA 5 and the gaskets 7. With this, the MEA 5 is mechanically fixed, and when a plurality of first cells 51 are stacked on one another in a thickness direction, the MEAs 5 are electrically connected to one another. Each of the separators 6a and 6b may be formed by a metal or a graphite each of which excels in thermal conductivity and electrical conductivity, or a mixture of the graphite and a resin. For example, each of the separators 6a and 6b may be formed by injection molding using a mixture of carbon powder and binder (solvent) or plating a titanium plate or a stainless steel plate with gold.

The groove-like fuel gas channel 8 through which the fuel gas flows is formed on one main surface (hereinafter referred to as an "inner surface") of the anode separator 6a which surface contacts the anode electrode 4a. Moreover, the groove-like cooling medium channel 10 through which the cooling medium flows is formed on the other main surface (hereinafter referred to as an "outer surface") of the anode separator 6a. Similarly, the groove-like oxidizing gas channel 9 through which the oxidizing gas flows is formed on one main surface (hereinafter referred to as an "inner surface") of the cathode separator 6b which surface contacts the cathode electrode 4b. Moreover, the groove-like cooling medium channel 10 through which the cooling medium flows is formed on the main surface (hereinafter referred to as an "outer surface") of the cathode separator 6b. In Embodiment 1, the fuel gas channel 8 and the oxidizing gas channel 9 are formed to realize a so-called opposed flow. Here, the opposed flow denotes such a flow that although the oxidizing gas and the fuel gas partially flow parallel to each other when viewed from a thickness direction of the first cell 51 (or the second cell 52), the flow direction of the oxidizing gas and the flow direction of the fuel gas are opposite to each other from upstream to downstream when viewed macroscopically (as a whole).

With this, the fuel gas and the oxidizing gas are respectively supplied to the anode electrode 4a and the cathode electrode 4b to react with each other. Thus, electricity and heat are generated. In addition, the generated heat is recovered by causing the cooling medium, such as cooling water, to flow through the cooling medium channel 10.

Method for Operating Fuel Cell and Operational Advantages Thereof

Next, a method for operating the fuel cell 100 according to Embodiment 1 and operational advantages thereof will be explained.

As described above, in the fuel cell 100 according to Embodiment 1, the cell block internal cooling medium channel 151A of the first cell block 101 and the cell block internal cooling medium channel 151B of the second cell block 102 are connected to each other in series by the cooling medium connecting channel 103. Then, the fuel gas, the oxidizing gas, and the cooling medium are supplied to the fuel cell 100. Here, in Embodiment 1, the fuel gas and the oxidizing gas, each of which has a dew point lower than the temperature of the cooling medium supplied to the fuel cell 100, are supplied to the fuel cell 100. The dew point of each of the fuel gas and the oxidizing gas supplied to the fuel cell 100 may be higher than the temperature of the cooling medium supplied to the fuel cell 100.

Therefore, while the cooling medium supplied to the first cell block 101 flows through the cooling medium supplying manifold 125A, the cooling medium is supplied to the cooling medium channels 10 of the first cells 51. While the cooling medium supplied to the cooling medium channel 10 flows through the cooling medium channel 10, the cooling medium recovers the heat generated by the reaction between the fuel gas and the oxidizing gas in the MEA 5 of the first cell 51 to be heated. The heated cooling medium flows to the cooling medium discharging manifold 126A of the first cell block 101, flows through the cooling medium discharging manifold 126A, and is supplied to the cooling medium connecting channel 103. Then, the cooling medium supplied to the cooling medium connecting channel 103 flows through the cooling medium connecting channel 103 to be supplied to the second cell block 102. With this, the internal temperature of the second cell block 102 can be set to be higher than that of the first cell block 101. Moreover, while the cooling medium heated by flowing through the first cell block 101 flows through the second cell block 102, the cooling medium recovers the heat generated by the reaction between the fuel gas and the oxidizing gas in the MEA 5 of the second cell 52 to be further heated. Therefore, the cooling medium discharged from the cooling medium discharging manifold 126B of the second cell block 102 can be further increased in temperature.

Moreover, in the fuel cell 100 according to Embodiment 1, the cell block internal fuel gas channel 152A of the first cell block 101 and the cell block internal fuel gas channel 152B of the second cell block 102 are connected to each other by the fuel gas connecting channel 104, and the cell block internal oxidizing gas channel 153A of the first cell block 101 and the cell block internal oxidizing gas channel 153B of the second cell block 102 are connected to each other by the oxidizing gas connecting channel 105.

Therefore, while the fuel gas and the oxidizing gas supplied to the first cell block 101 respectively flow through the fuel gas supplying manifold 121A and the oxidizing gas supplying manifold 123A, the fuel gas and the oxidizing gas are respectively supplied to the fuel gas channel 8 and the oxidizing gas channel 9 of each of the first cells 51. The fuel gas and the oxidizing gas respectively supplied to the fuel gas channel 8 and the oxidizing gas channel 9 react with each other in the MEA 5 of the first cell 51 to generate water. Then, the fuel gas and the oxidizing gas are humidified by the generated water. The humidified fuel gas and the humidified oxidizing gas respectively flow through the fuel gas discharging manifold 122A and the oxidizing gas discharging manifold 124A to be respectively supplied to the fuel gas connecting channel 104 and the oxidizing gas connecting channel 105. The fuel gas and the oxidizing gas respectively supplied to the fuel gas connecting channel 104 and the oxidizing gas connecting channel 105 respectively flow through the fuel gas connecting channel 104 and the oxidizing gas connecting channel 105 to be supplied to the second cell block 102. With this, the polymer electrolyte membrane 1 of the second cell 52 of the second cell block 102 can be further prevented from drying.

The humidified fuel gas and the humidified oxidizing gas are supplied to the second cell block 102. However, as described above, the internal temperature of the second cell block 102 is higher than that of the first cell block 101 (for example, the first cell block 101 is 65° C., and the second cell block 102 is 80° C.). Therefore, the relative humidity of the second cell block 102 becomes lower than that of the first cell block 101. To be specific, the electric power generating operation can be carried out under such conditions that the relative humidity of the fuel gas flowing through the cell block internal fuel gas channel 152B of the second cell block 102 is lower than that of the fuel gas flowing through the cell block internal fuel gas channel 152A of the first cell block 101 and the relative humidity of the oxidizing gas flowing through the cell block internal oxidizing gas channel 153B of the second cell block 102 is lower than that of the oxidizing gas flowing through the cell block internal oxidizing gas channel 153A of the first cell block 101.

Then, in the fuel cell 100 according to Embodiment 1, the electrode catalyst supporting rate of the catalyst supporting carbon used in at least one of the anode catalyst layer 2a and the cathode catalyst layer 2b of the second cell 52, the electrode catalyst supporting amount of the catalyst supporting carbon, the ion exchange capacity of the polymer electrolyte, and the ratio (WP/WCat-C) of the mass WP of the polymer electrolyte to the mass WCat-C of the catalyst supporting carbon are set to be respectively higher or larger than the electrode catalyst supporting rate of the catalyst supporting carbon used in the anode catalyst layer 2a and the cathode catalyst layer 2b of the first cell 51, the electrode catalyst supporting amount of the catalyst supporting carbon, the ion exchange capacity of the polymer electrolyte, and the ratio (WP/WCat-C) of the mass WP of the polymer electrolyte to the mass WCat-C of the catalyst supporting carbon.

Therefore, even in a case where the first cell block 101 of the fuel cell 100 according to Embodiment 1 is low in temperature and high in relative humidity, the fine holes of the catalyst layer can be prevented from being clogged by the swelling of the polymer electrolyte or the generated water, and the gas diffusivity of each of the anode catalyst layer 2a and the cathode catalyst layer 2b can be prevented from deteriorating by the swelling of the polymer electrolyte and the generated water. With this, the power generation efficiency can be improved. Moreover, even in a case where the second cell block 102 is high in temperature and low in relative humidity, the anode catalyst layer 2a and the cathode catalyst layer 2b can be prevented from drying, and the ion conductivity of each of the anode catalyst layer 2a and the cathode catalyst layer 2b can be prevented from deteriorating. With this, the power generation efficiency can be improved.

Therefore, in the fuel cell 100 according to Embodiment 1, the temperature of the cooling medium discharged from the second cell block 102 of the fuel cell 100 can be increased, and high power generation efficiency can be realized without increasing the size and cost of the humidifier.

In the fuel cell 100 according to Embodiment 1, the electrode catalyst supporting rate of the catalyst supporting carbon used in at least one of the anode catalyst layer 2a and the cathode catalyst layer 2b of the second cell 52, the electrode catalyst supporting amount of the catalyst supporting carbon, the ion exchange capacity of the polymer electrolyte, and the ratio (WP/WCat-C) of the mass WP of the polymer electrolyte to the mass WCat-C of the catalyst supporting carbon are set to be respectively higher or larger than the electrode catalyst supporting rate of the catalyst supporting carbon used in the anode catalyst layer 2a and the cathode catalyst layer 2b of the first cell 51, the electrode catalyst supporting amount of the catalyst supporting carbon, the ion exchange capacity of the polymer electrolyte, and the ratio (WP/WCat-C) of the mass WP of the polymer electrolyte to the mass WCat-C of the catalyst supporting carbon. However, the present embodiment is not limited to this. The above operational advantages can be obtained as long as at least one of the electrode catalyst supporting rate of the catalyst supporting carbon of the second cell 52, the electrode catalyst supporting amount of the catalyst supporting carbon, the ion exchange capacity of the polymer electrolyte, and the ratio (WP/WCat-C) of the mass WP of the polymer electrolyte to the mass WCat-C of the catalyst supporting carbon is set to be higher or larger than the electrode catalyst supporting rate of the catalyst supporting carbon used in the anode catalyst layer 2a and the cathode catalyst layer 2b of the first cell 51, the electrode catalyst supporting amount of the catalyst supporting carbon, the ion exchange capacity of the polymer electrolyte, or the ratio (WP/WCat-C) of the mass WP of the polymer electrolyte to the mass WCat-C of the catalyst supporting carbon.

Embodiment 2

Figure 5:
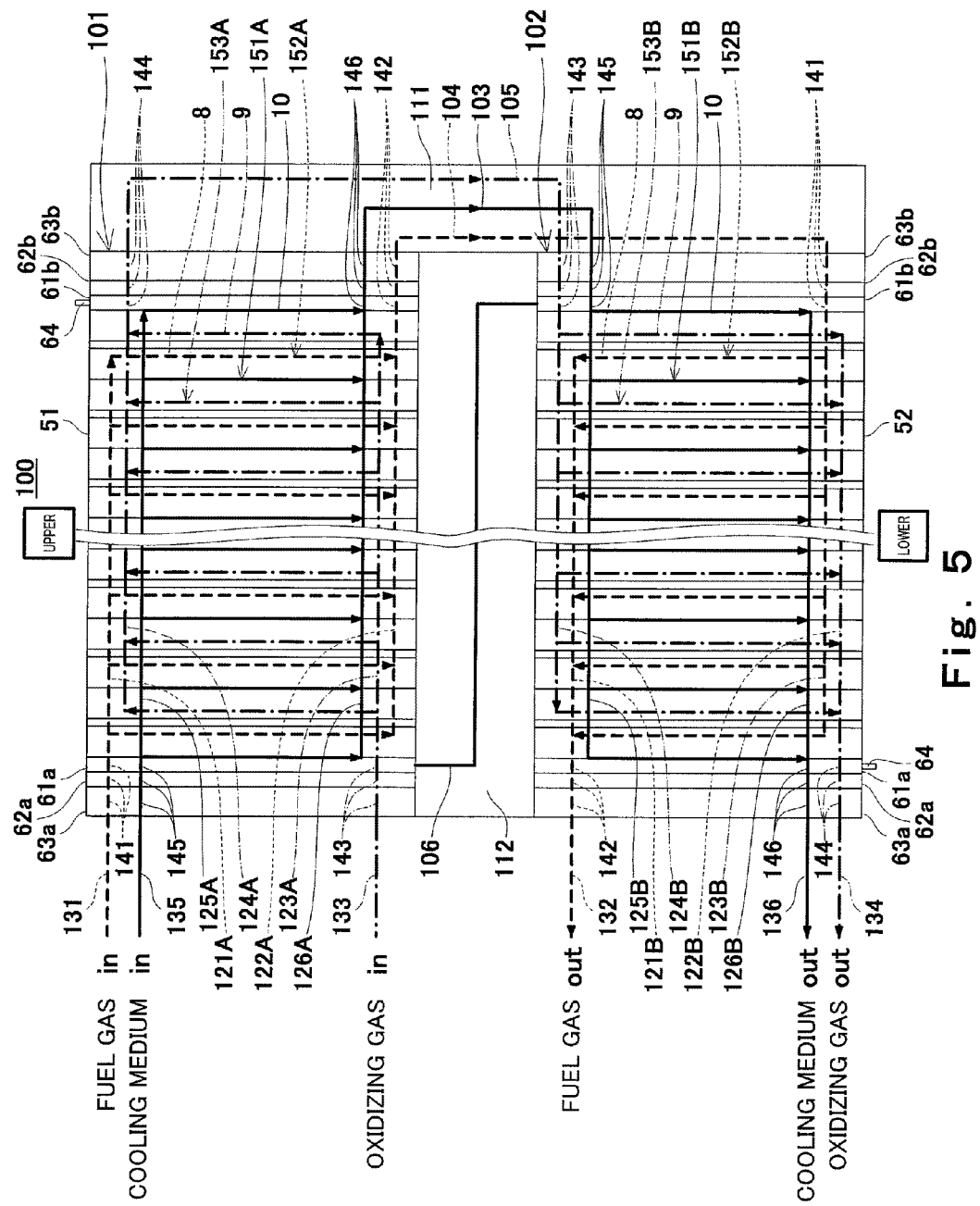
FIG. 5 is a schematic diagram showing a schematic configuration of the fuel cell according to Embodiment 2 of the present invention.

FIG. 5 is a schematic diagram showing a schematic configuration of the fuel cell according to Embodiment 2 of the present invention. In FIG. 5, a vertical direction of the fuel cell is shown as a vertical direction of the drawing, and a part of the fuel cell is omitted.

As shown in FIG. 5, the fuel cell 100 according to Embodiment 2 of the present invention is the same in basic configuration as the fuel cell 100 according to Embodiment 1 but is different from the fuel cell 100 according to Embodiment 1 in that: the positions of the manifolds, such as the fuel gas supplying manifold 121B of the second cell block 102, are changed; a connecting plate 111 is disposed to connect an end portion of the first cell block 101 and an end portion of the second cell block 102; the cooling medium connecting channel 103, the fuel gas connecting channel 104, and the oxidizing gas connecting channel 105 are formed in the connecting plate 111; and a heat insulating member 112 is disposed between the first cell block 101 and the second cell block 102. Hereinafter, these differences will be explained.

First, the positions of the manifolds, such as the fuel gas supplying manifold 121B of the second cell block 102, will be explained in reference to FIGS. 5 and 6.

Figure 6:
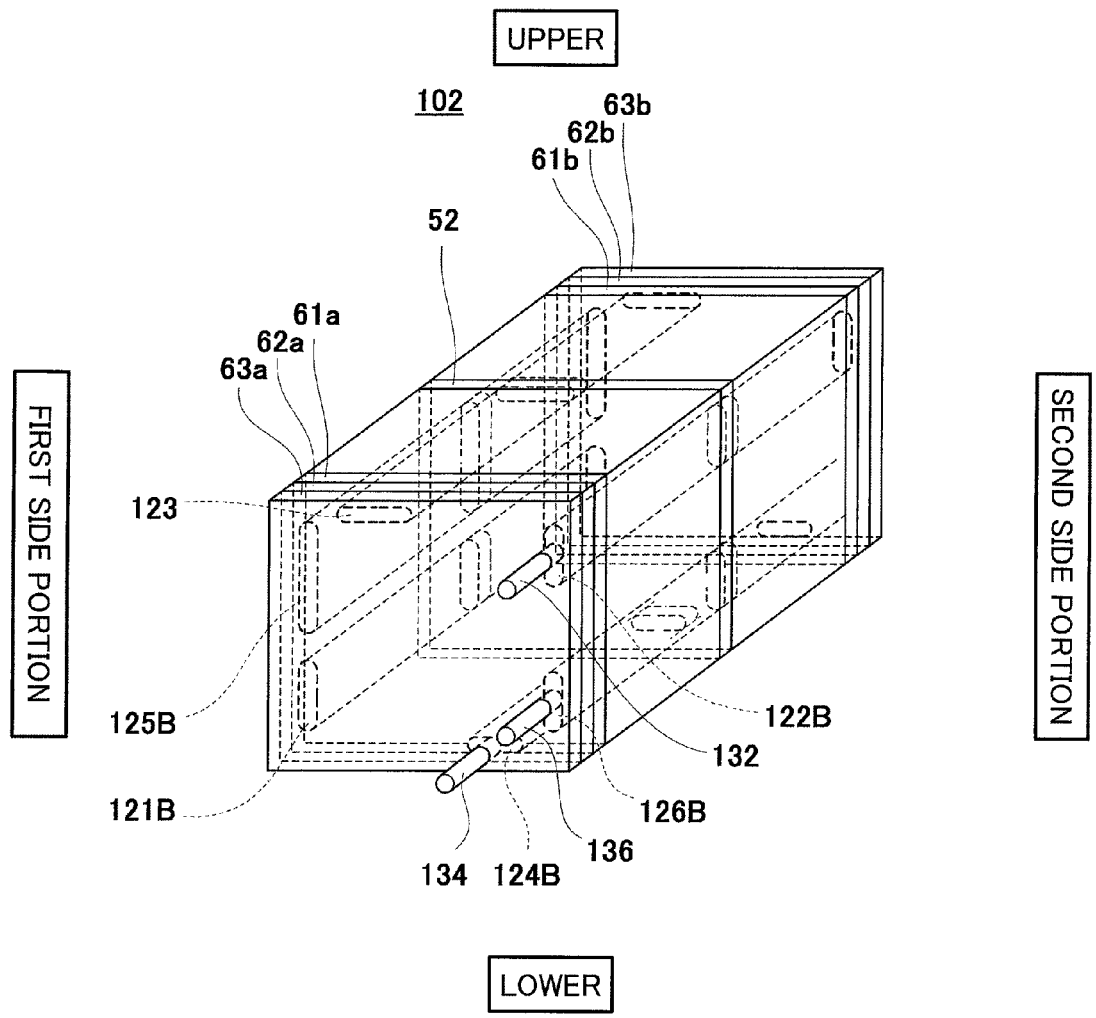
FIG. 6 is a perspective view schematically showing a schematic configuration of the second cell stack shown in FIG. 5.

FIG. 6 is a perspective view schematically showing a schematic configuration of the second cell block 102 shown in FIG. 5. In FIG. 6, a vertical direction of the second cell block 102 is shown as a vertical direction of the drawing.

As shown in FIG. 6, the cooling medium supplying manifold 125B is formed at an upper portion of the first side portion of the second cell block 102 so as to penetrate in the stack direction of the second cell 52 of the second cell block 102. The fuel gas supplying manifold 121B is formed under the cooling medium supplying manifold 125B so as to penetrate in the stack direction of the second cell 52 of the second cell block 102. Moreover, the oxidizing gas supplying manifold 123B is formed on an upper inner side of the cooling medium supplying manifold 125B so as to penetrate in the stack direction of the second cell 52 of the second cell block 102.

Moreover, the cooling medium discharging manifold 126B is formed at a lower portion of the second side portion of the second cell block 102 so as to penetrate in the stack direction of the second cell 52 of the second cell block 102. The fuel gas discharging manifold 122B is formed above the cooling medium discharging manifold 126B so as to penetrate in the stack direction of the second cell 52 of the second cell block 102. Moreover, the oxidizing gas discharging manifold 124B is formed on a lower inner side of the cooling medium discharging manifold 126B so as to penetrate in the stack direction of the second cell 52 of the second cell block 102.

Then, the heat insulating member 112 is disposed between the second cell block 102 configured as above and the first cell block 101. The heat insulating member 112 may be any member as long as it can prevent the heat exchange between the first cell block 101 and the second cell block 102 from occurring. For example, the heat insulating member 112 may be formed by ceramic, a bubble-containing resin-based heat insulating material, a vacuum heat insulating material, or the like. Moreover, for example, the heat insulating member 112 may be a member formed such that resin plates sandwich ceramic, a bubble-containing resin-based heat insulating material, a vacuum heat insulating material, or the like. With this, the heat exchange between the first cell block 101 and the second cell block 102 can be prevented from occurring. Therefore, the temperature of the cooling medium discharged from the second cell block 102 can be maintained high. For example, in a case where a distance between the first cell block 101 and the second cell block 102 is large, the heat insulating member 112 does not have to be provided as long as the heat exchange between the first cell block 101 and the second cell block 102 can be prevented from occurring.

Moreover, the connecting plate 111 is disposed to contact a main surface of the second end plate 63b of the first cell block 101 and a main surface of the second end plate 63b of the second cell block 102. Here, the configuration of the connecting plate 111 will be explained in reference to FIGS. 5, 7, and 8.

Figure 7:
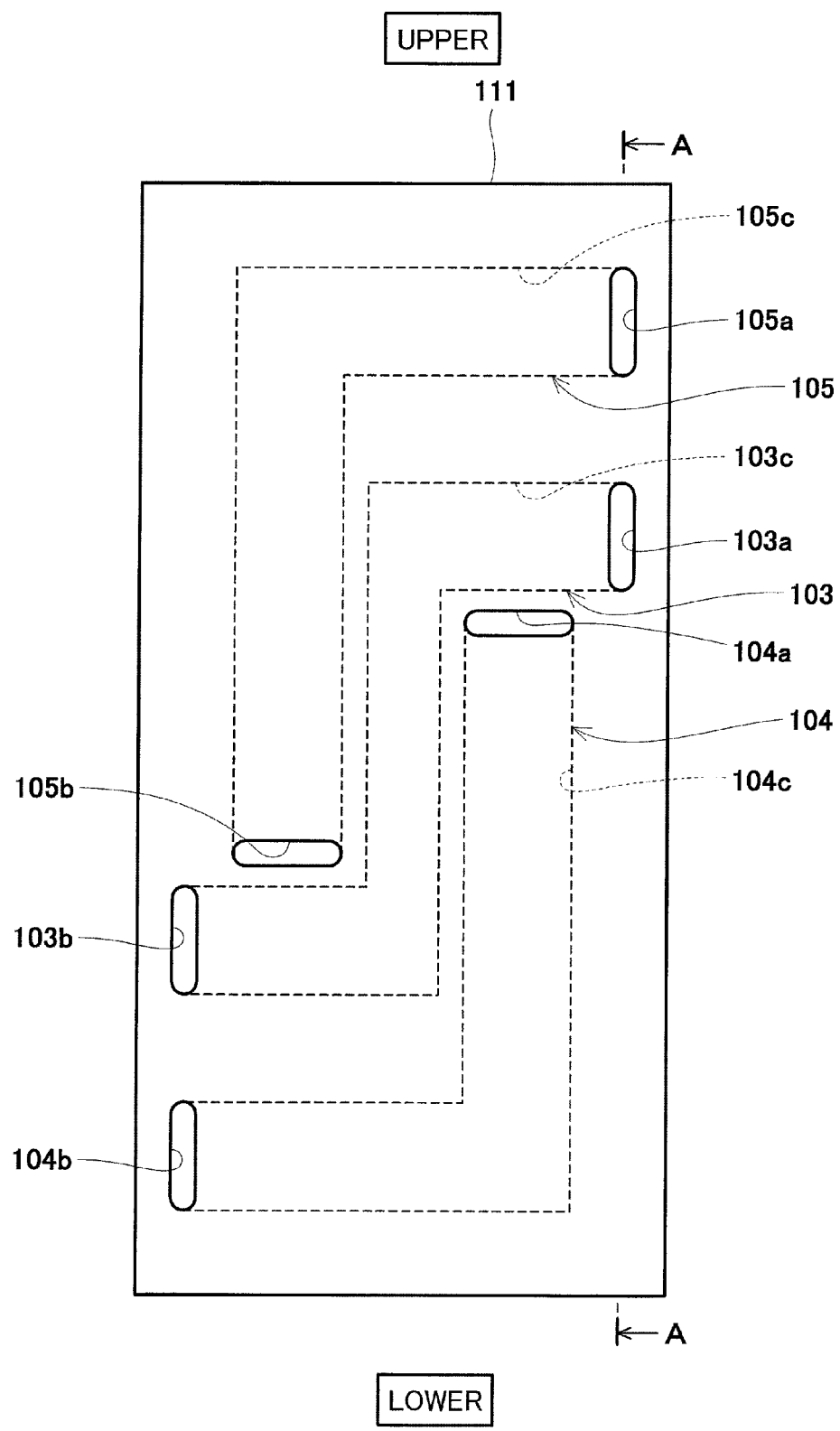
FIG. 7 is a front view schematically showing a schematic configuration of a connecting plate of the fuel cell shown in FIG. 5.
Figure 8:
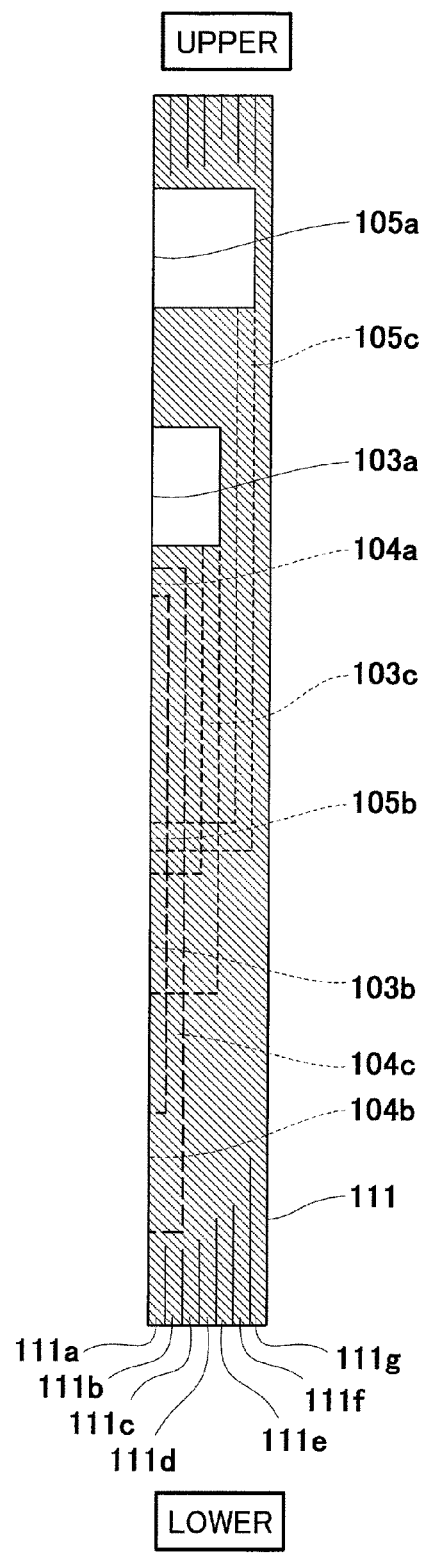
FIG. 8 is a cross-sectional view taken along line A-A of FIG. 7.
Figure 9:
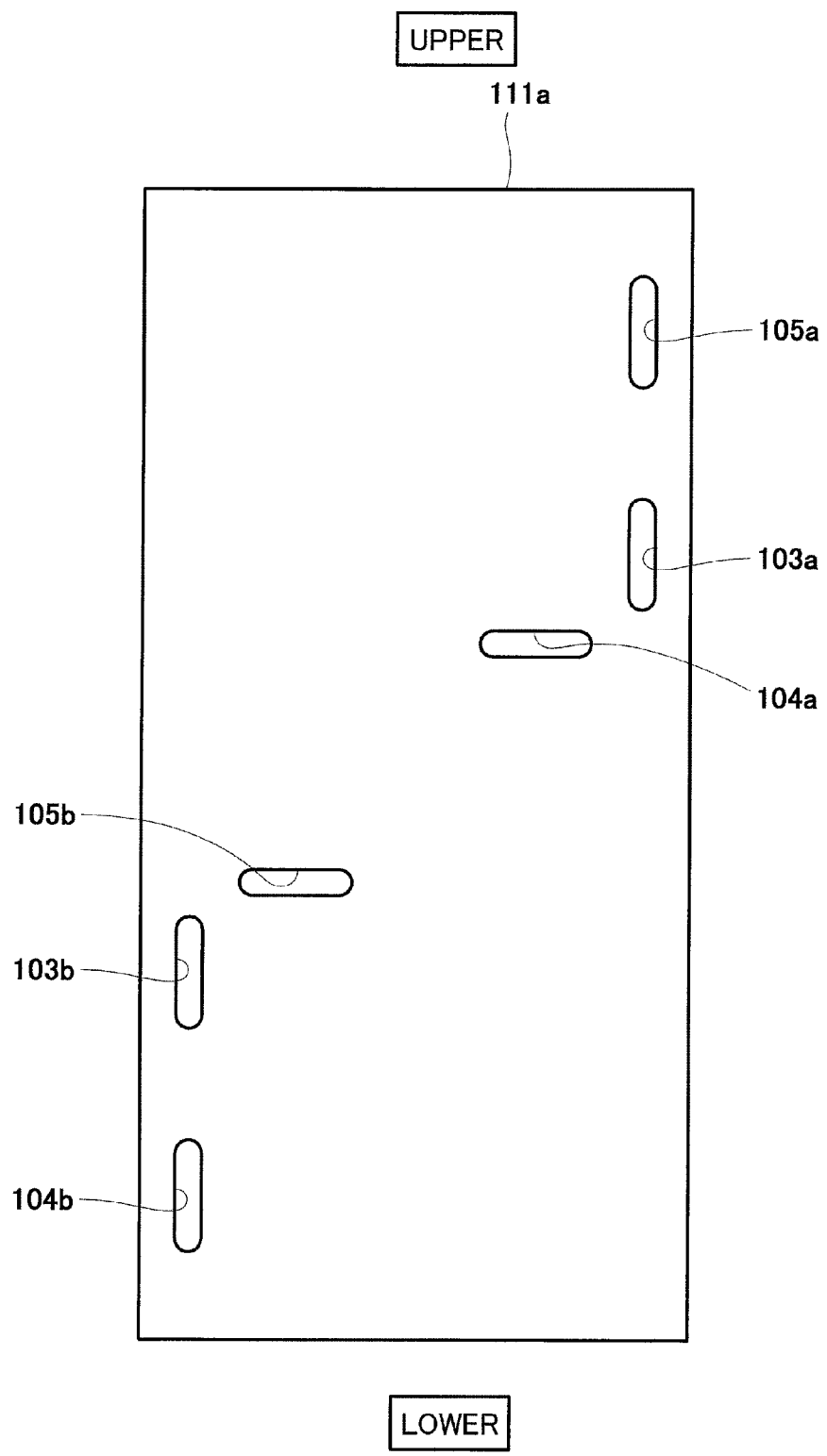
FIG. 9 is a front view schematically showing a schematic configuration of a plate member of the connecting plate shown in FIG. 7.
Figure 10:
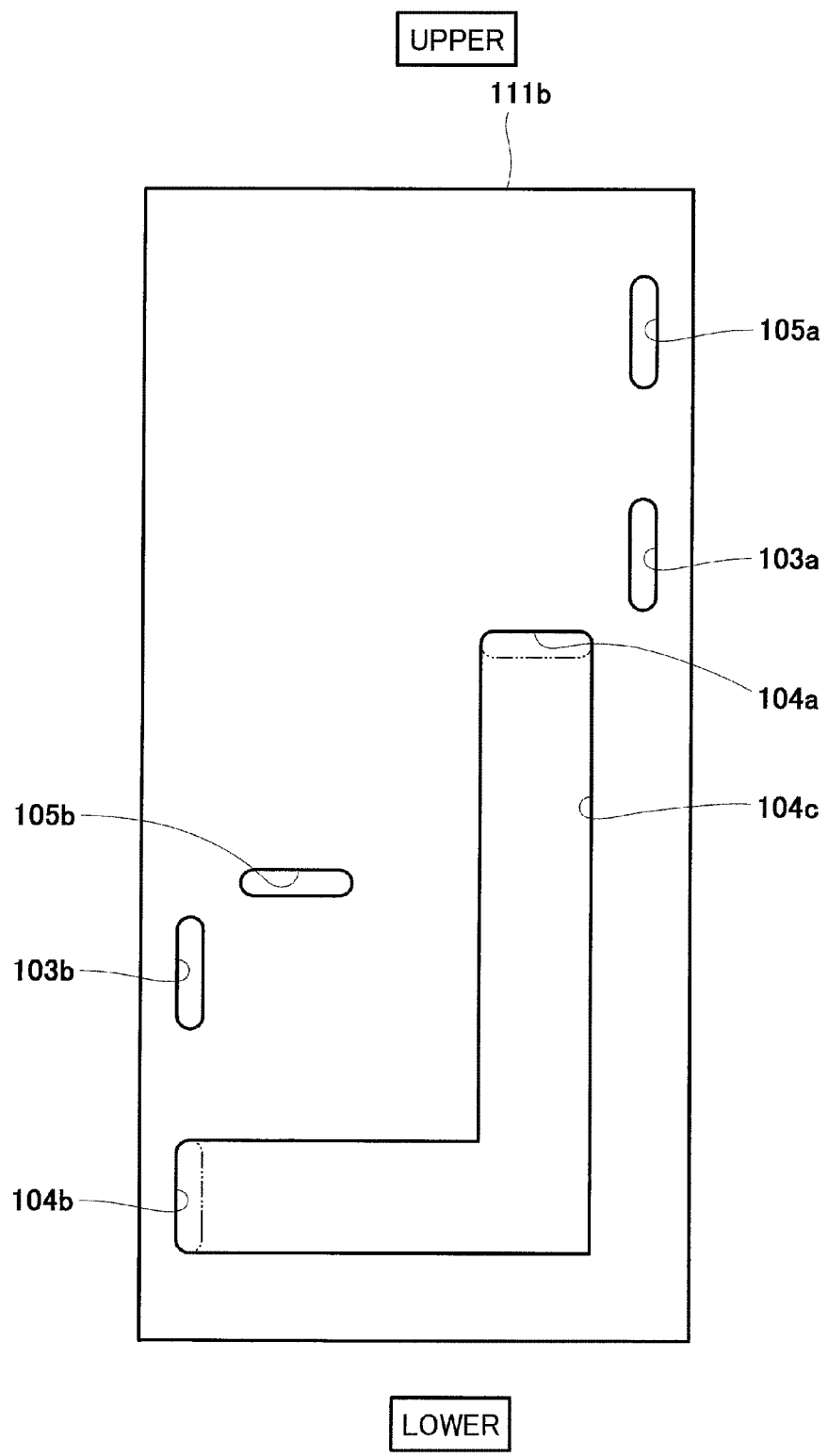
FIG. 10 is a front view schematically showing a schematic configuration of the plate member of the connecting plate shown in FIG. 7.
Figure 11:
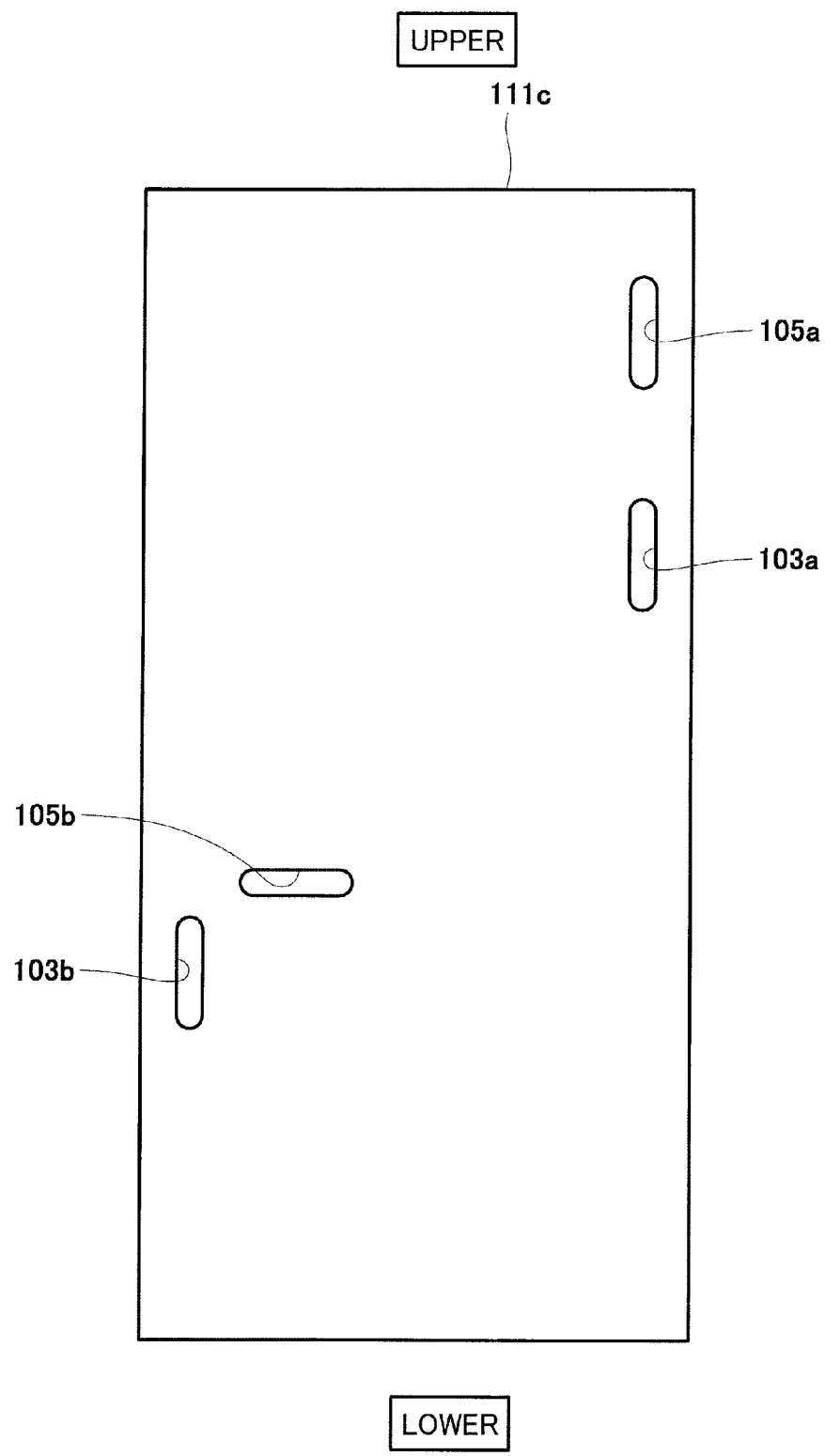
FIG. 11 is a front view schematically showing a schematic configuration of the plate member of the connecting plate shown in FIG. 7.
Figure 12:
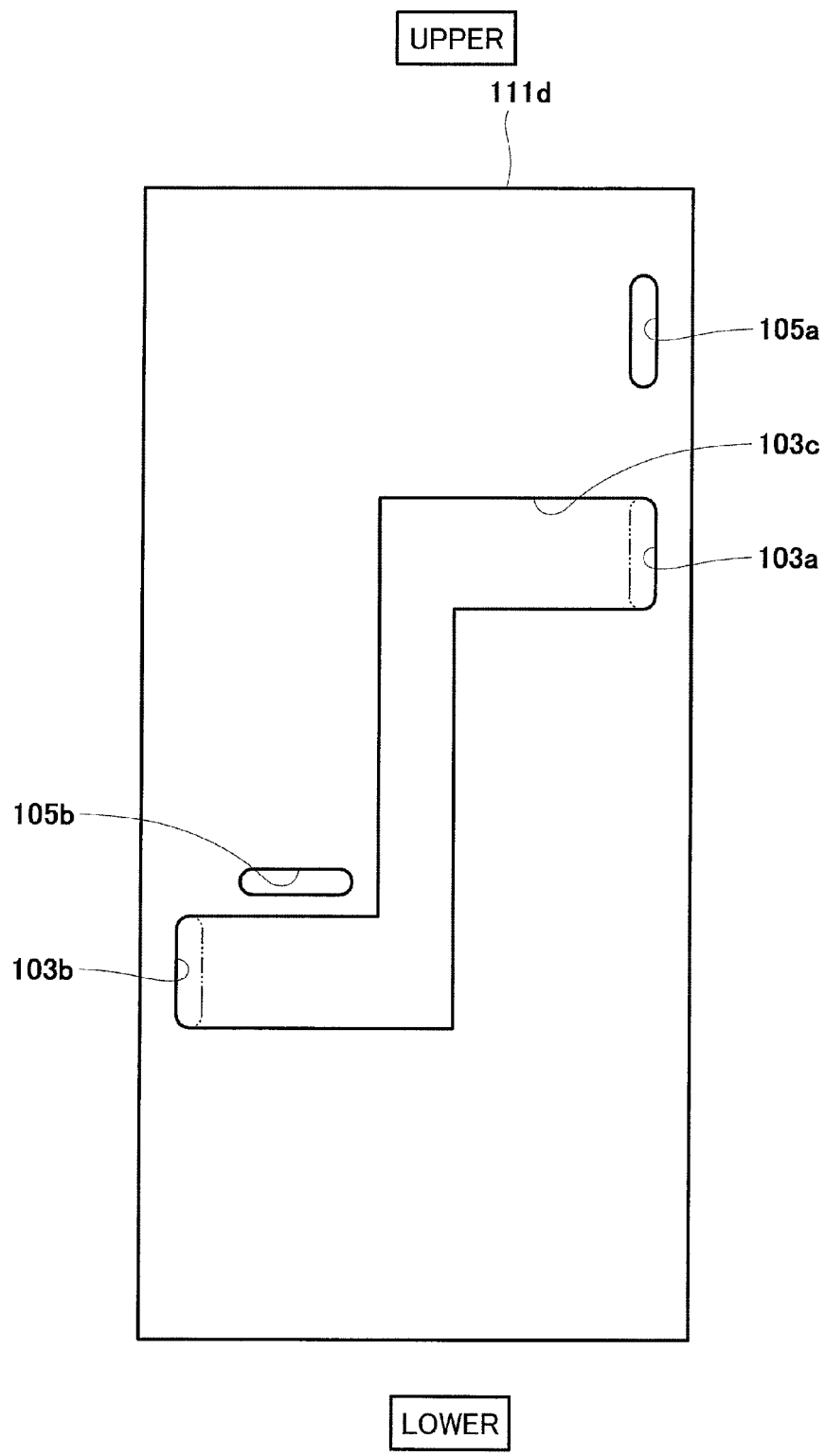
FIG. 12 is a front view schematically showing a schematic configuration of the plate member of the connecting plate shown in FIG. 7.
Figure 13:
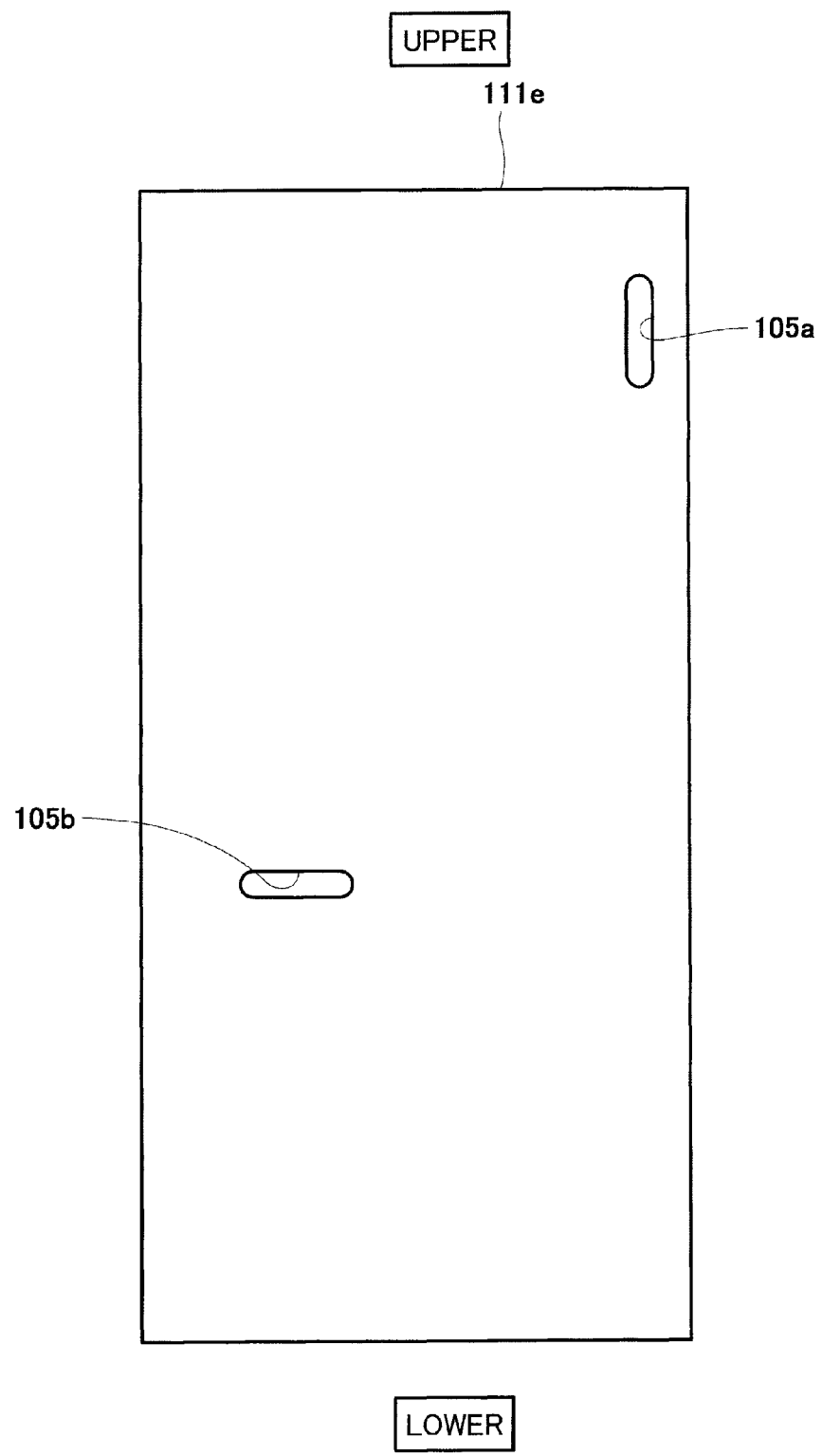
FIG. 13 is a front view schematically showing a schematic configuration of the plate member of the connecting plate shown in FIG. 7.
Figure 14:
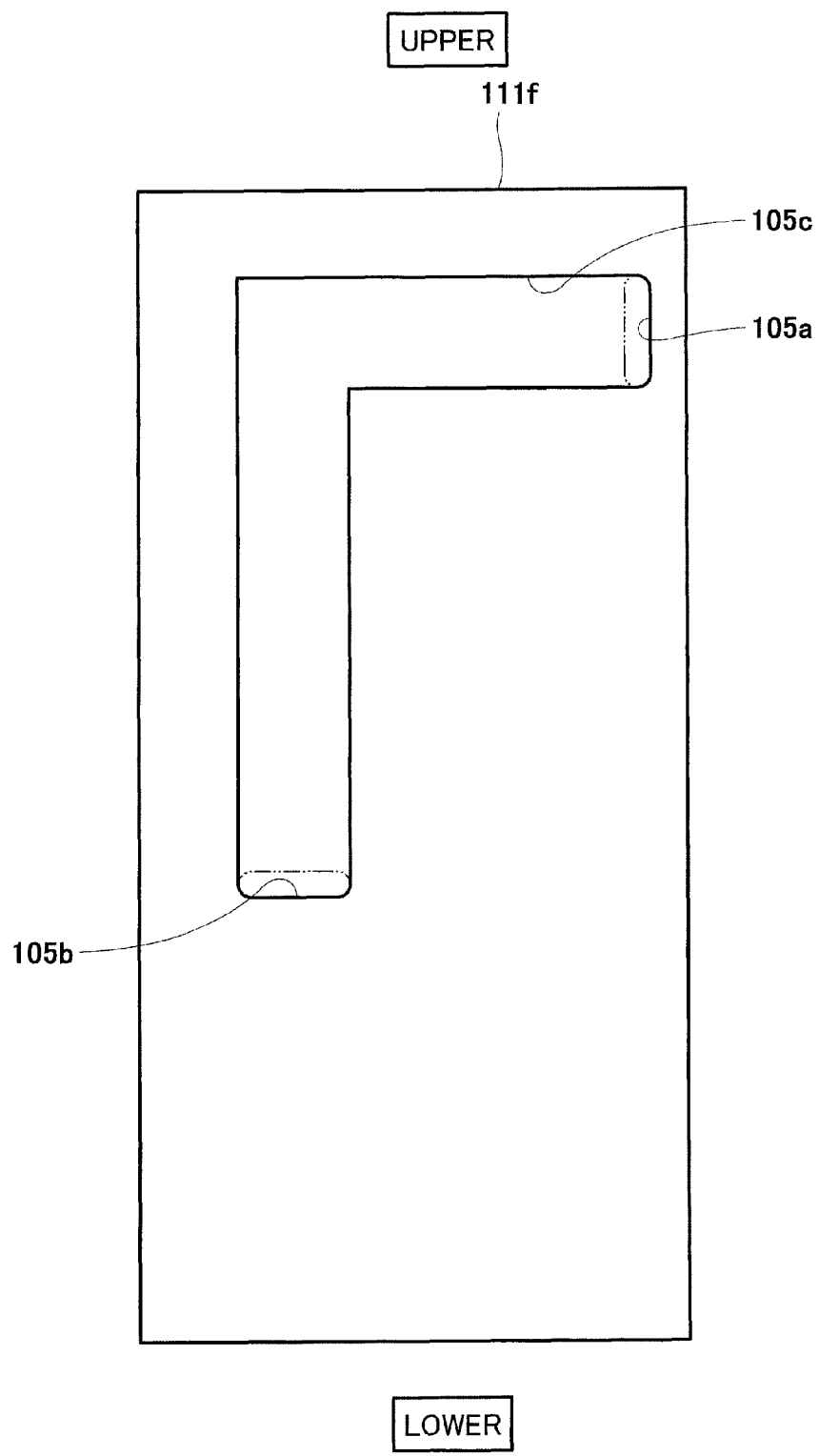
FIG. 14 is a front view schematically showing a schematic configuration of the plate member of the connecting plate shown in FIG. 7.
Figure 15:
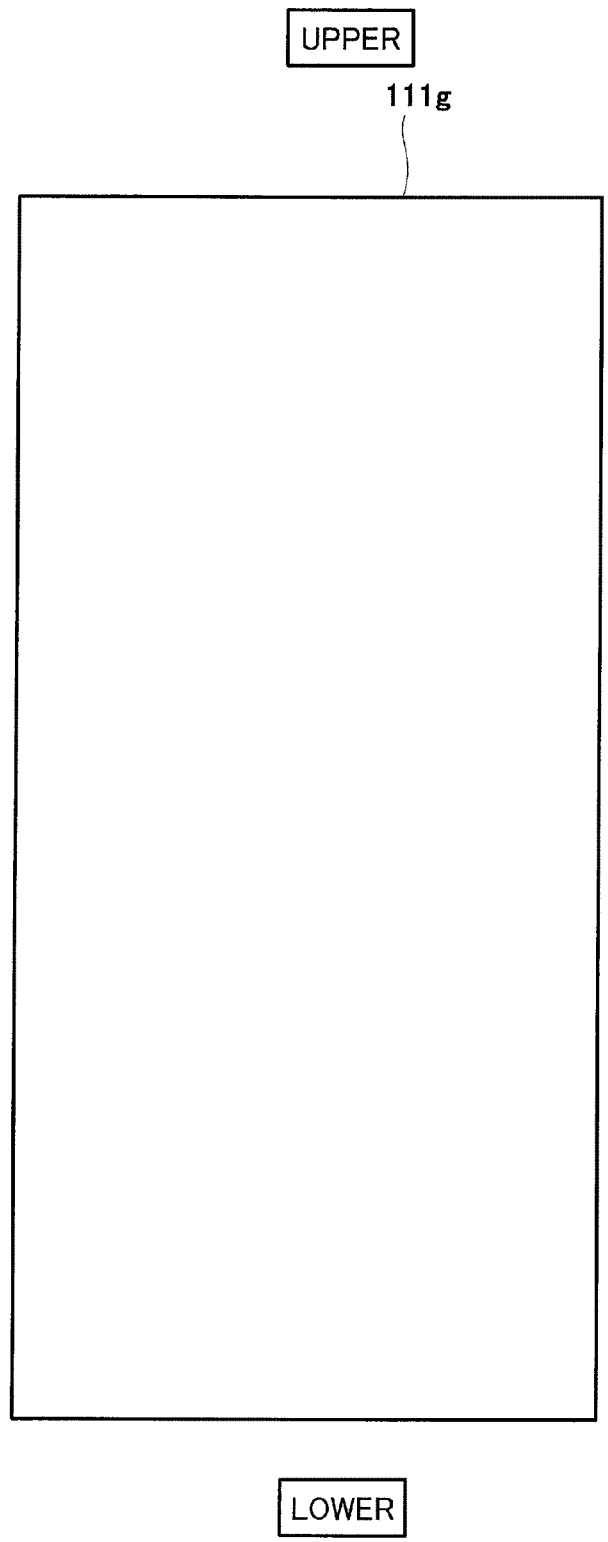
FIG. 15 is a front view schematically showing a schematic configuration of the plate member of the connecting plate shown in FIG. 7.

FIG. 7 is a front view schematically showing a schematic configuration of the connecting plate 111 of the fuel cell 100 shown in FIG. 5. FIG. 8 is a cross-sectional view taken along line A-A of FIG. 7. In FIGS. 7 and 8, a vertical direction of the connecting plate 111 is shown as a vertical direction of the drawing.

As shown in FIGS. 5, 7, and 8, the connecting plate 111 is constituted by plate members 111a to 111g. A recess 105a is formed on a main surface (hereinafter referred to as an "inner surface") of the connecting plate 111 which surface contacts the second end plate 63b, so as to be communicated with the through hole 144 (the oxidizing gas discharging manifold 124A of the first cell block 101) of the first cell block 101, and a recess 105b is formed on the inner surface of the connecting plate 111 so as to be communicated with the through hole 143 (the oxidizing gas supplying manifold 123B of the second cell block 102) of the second cell block 102. Then, a tunnel-shaped channel 105c is formed inside the connecting plate 111 such that the recess 105a and the recess 105b are communicated with each other. The recess 105a, the channel 105c, and the recess 105b constitute the oxidizing gas connecting channel 105.

Moreover, a recess 103a is formed on the inner surface of the connecting plate 111 so as to be communicated with the through hole 146 (the cooling medium discharging manifold 126A of the first cell block 101) of the first cell block 101, and a recess 103b is formed on the inner surface of the connecting plate 111 so as to be communicated with the through hole 145 (the cooling medium supplying manifold 125B of the second cell block 102) of the second cell block 102. Then, a tunnel-shaped channel 103c is formed inside the connecting plate 111 such that the recess 103a and the recess 103b are communicated with each other. The recess 103a, the channel 103c, and the recess 103b constitute the cooling medium connecting channel 103.

Further, a recess 104a is formed on the inner surface of the connecting plate 111 so as to be communicated with the through hole 142 (the fuel gas discharging manifold 122A of the first cell block 101) of the first cell block 101, and a recess 104b is formed on the inner surface of the connecting plate 111 so as to be communicated with the through hole 141 (the fuel gas supplying manifold 121B of the second cell block 102) of the second cell block 102. Then, a tunnel-shaped channel 104c is formed inside the connecting plate 111 such that the recess 104a and the recess 104b are communicated with each other. The recess 104a, the channel 104c, and the recess 104b constitute the fuel gas connecting channel 104.

The connecting plate 111 may be any member as long as it can prevent the heat exchange between the first cell block 101 and the second cell block 102 from occurring (to be specific, as long as the connecting plate 111 is made of a high heat insulating material). For example, the connecting plate 111 may be made of ceramic, a bubble-containing resin-based heat insulating material, a vacuum heat insulating material, or the like. Moreover, for example, the connecting plate 111 may be a member formed such that resin plates sandwich ceramic, a bubble-containing resin-based heat insulating material, a vacuum heat insulating material, or the like.

Next, a method for manufacturing the connecting plate 111 will be explained in reference to FIGS. 7 to 15. FIGS. 9 to 15 are front views schematically showing schematic configurations of the plate members 111a to 111g of the connecting plate 111 shown in FIG. 7.

First, as shown in FIGS. 9 to 15, through holes and/or grooves penetrating in the thickness direction are formed on main surfaces of the plate members 111a to 111g to form the recesses 103a, 103b, 104a, 104b, 105a, and 105b and the channels 103c, 104c, and 105c.

Next, the plate members 111a to 111g are bonded to one another by a suitable method to manufacture the connecting plate 111.

In the present embodiment, the plate members 111a to 111g are bonded to one another to manufacture the connecting plate 111. However, the present embodiment is not limited to this. For example, the connecting plate 111 may be manufactured by hollow molding in a case where the connecting plate 111 is formed by a resin.

The fuel cell 100 according to Embodiment 2 configured as above obtains the same operational advantages as the fuel cell 100 according to Embodiment 1.

Embodiment 3

Figure 16:
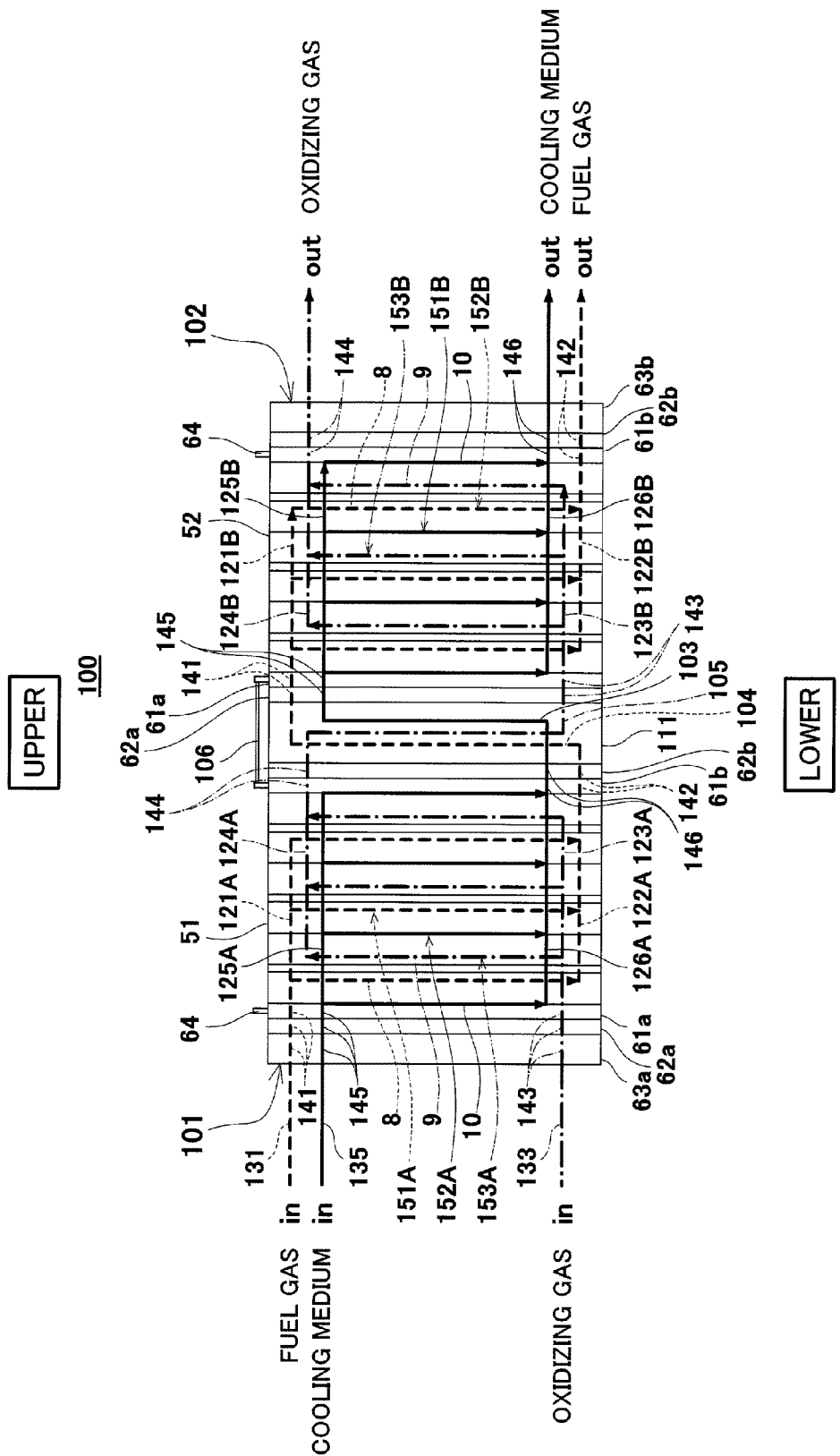
FIG. 16 is a schematic diagram showing a schematic configuration of the fuel cell according to Embodiment 3 of the present invention.
Figure 17:
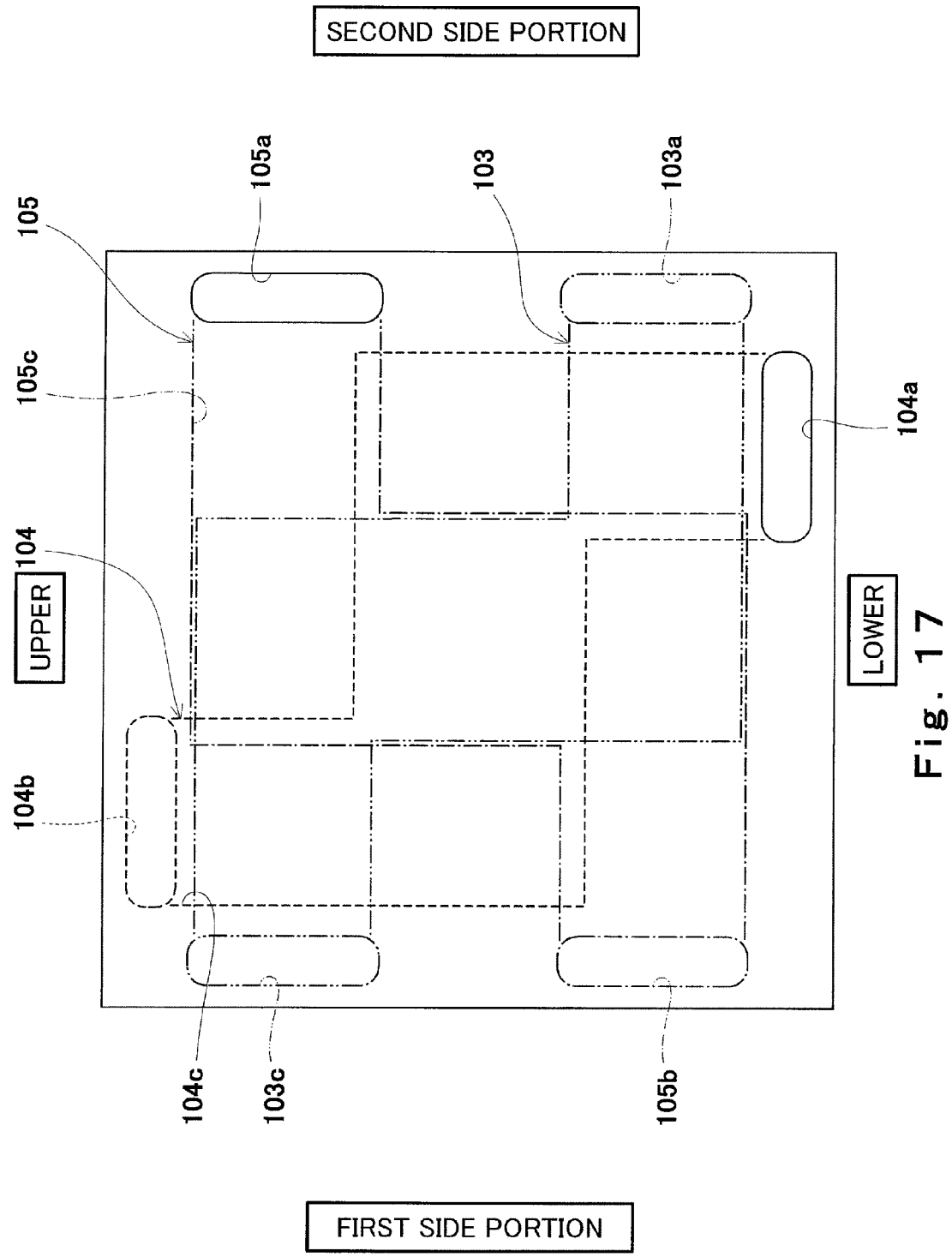
FIG. 17 is a front view schematically showing a schematic configuration of the connecting plate of the fuel cell shown in FIG. 16.

FIG. 16 is a schematic diagram showing a schematic configuration of the fuel cell according to Embodiment 3 of the present invention. FIG. 17 is a front view schematically showing a schematic configuration of the connecting plate of the fuel cell shown in FIG. 16. In FIG. 16, a vertical direction of the fuel cell is shown as a vertical direction of the drawing. Moreover, in FIG. 17, a vertical direction of the connecting plate is shown as a vertical direction of the drawing, and positions of respective channels are shifted to make the channels more visible.

As shown in FIG. 16, the fuel cell 100 according to Embodiment 3 of the present invention is the same in basic configuration as the fuel cell 100 according to Embodiment 2 but is different from the fuel cell 100 according to Embodiment 2 in that: the first cell block 101 and the second cell block 102 are configured in the same manner; when viewed from the stack direction of the first cell 51 (or the second cell 52), the first cell block 101 and the second cell block 102 are arranged to overlap each other while sandwiching the connecting plate 111; and the second end plate 63b of the first cell block 101 and the first end plate 63a of the second cell block 102 are omitted. Moreover, the fuel cell 100 according to Embodiment 3 is different from the fuel cell 100 according to Embodiment 2 in that: the first current collector 61a and the first insulating plate 62a of the first cell block 101 and the first current collector 61a and the first insulating plate 62a of the second cell block 102 are respectively configured in the same manner; and the second current collector 61b and the second insulating plate 62b of the first cell block 101 and the second current collector 61b and the second insulating plate 62b of the second cell block 102 are configured in the same manner. Moreover, the fuel cell 100 according to Embodiment 3 is different from the fuel cell 100 according to Embodiment 2 in that: when viewed from the stack direction of the first cell 51 (or the second cell 52), the second current collector 61b and the second insulating plate 62b of the first cell block 101 are arranged to be opposed to each other while sandwiching the connecting plate 111; and the second current collector 61b of the first cell block 101 and the first current collector 61a of the second cell block 102 are connected to each other by the electric wire 106. Further, the cooling medium connecting channel 103, the fuel gas connecting channel 104, and the oxidizing gas connecting channel 105 of the connecting plate 111 in the fuel cell 100 according to Embodiment 3 are different from those in the fuel cell 100 according to Embodiment 2.

Specifically, the through hole 141 is formed on the main surface of each of the first current collector 61a and the first insulating plate 62a of the first cell block 101 (the second cell block 102) so as to be communicated with the fuel gas supplying manifold 121A of the first cell block 101 (so as to be communicated with the fuel gas supplying manifold 121B of the second cell block 102), and the through hole 143 is formed on the main surface of each of the first current collector 61a and the first insulating plate 62a of the first cell block 101 (the second cell block 102) so as to be communicated with the oxidizing gas supplying manifold 123A of the first cell block 101 (so as to be communicated with the oxidizing gas supplying manifold 123B of the second cell block 102). Moreover, the through hole 145 is formed on the main surface of each of the first current collector 61a and the first insulating plate 62a of the first cell block 101 (the second cell block 102) so as to be communicated with the cooling medium supplying manifold 125A of the first cell block 101 (so as to be communicated with the cooling medium supplying manifold 125B of the second cell block 102).

Moreover, the through hole 142 is formed on the main surface of each of the second current collector 61b and the second insulating plate 62b of the first cell block 101 (the second cell block 102) so as to be communicated with the fuel gas discharging manifold 122A of the first cell block 101 (so as to be communicated with the fuel gas discharging manifold 122B of the second cell block 102), and the through hole 144 is formed on the main surface of each of the second current collector 61b and the second insulating plate 62b of the first cell block 101 (the second cell block 102) so as to be communicated with the oxidizing gas discharging manifold 124A of the first cell block 101 (so as to be communicated with the oxidizing gas discharging manifold 124B of the second cell block 102). Moreover, the through hole 146 is formed on the main surface of each of the second current collector 61b and the second insulating plate 62b of the first cell block 101 (the second cell block 102) so as to be communicated with the cooling medium discharging manifold 126A of the first cell block 101 (so as to be communicated with the cooling medium discharging manifold 126B of the second cell block 102).

Then, as shown in FIGS. 16 and 17, the recess 105a is formed on one main surface (main surface contacting the second insulating plate 62b of the first cell block 101) of the connecting plate 111 so as to be communicated with the through hole 142 (the fuel gas discharging manifold 122A) of the first cell block 101 and the through hole 144 (the oxidizing gas discharging manifold 124A of the first cell block 101) of the first cell block 101. Moreover, the recess 105b is formed on the other main surface (main surface contacting the first insulating plate 62a of the second cell block 102) of the connecting plate 111 so as to be communicated with the through hole 143 (the oxidizing gas supplying manifold 123B of the second cell block 102) of the second cell block 102. Then, the tunnel-shaped channel 105c is formed inside the connecting plate 111 such that the recess 105a and the recess 105b are communicated with each other. The recess 105a, the channel 105c, and the recess 105b constitute the oxidizing gas connecting channel 105.

Moreover, the recess 103a is formed on one main surface of the connecting plate 111 so as to be communicated with the through hole 146 (the cooling medium discharging manifold 126A of the first cell block 101) of the first cell block 101, and the recess 103b is formed on the other main surface of the connecting plate 111 so as to be communicated with the through hole 145 (the cooling medium supplying manifold 125B of the second cell block 102) of the second cell block 102. Then, the tunnel-shaped channel 103c is formed inside the connecting plate 111 such that the recess 103a and the recess 103b are communicated with each other. The recess 103a, the channel 103c, and the recess 103b constitute the cooling medium connecting channel 103.

Further, the recess 104a is formed on one main surface of the connecting plate 111 so as to be communicated with the through hole 142 (the fuel gas discharging manifold 122A of the first cell block 101) of the first cell block 101, and the recess 104b is formed on the other main surface of the connecting plate 111 so as to be communicated with the through hole 141 (the fuel gas supplying manifold 121B of the second cell block 102) of the second cell block 102. Then, the tunnel-shaped channel 104c is formed inside the connecting plate 111 such that the recess 104a and the recess 104b are communicated with each other. The recess 104a, the channel 104c, and the recess 104b constitute the fuel gas connecting channel 104.

Herein, the connecting plate 111 is formed so as to be able to prevent the heat exchange between the first cell block 101 and the second cell block 102 from occurring. However, the present embodiment is not limited to this. A heat insulating member made of a material having high heat insulating effect may be arranged between the connecting plate 111 and the first cell block 101 or between the connecting plate 111 and the second cell block 102. Moreover, in a case where the connecting plate 111 has an insulation property, the second insulating plate 62b of the first cell block 101 and/or the first insulating plate 62a of the second cell block 102 may be omitted.

The fuel cell 100 according to Embodiment 3 configured as above obtains the same operational advantages as the fuel cell 100 according to Embodiment 2.

Embodiment 4

Figure 18:
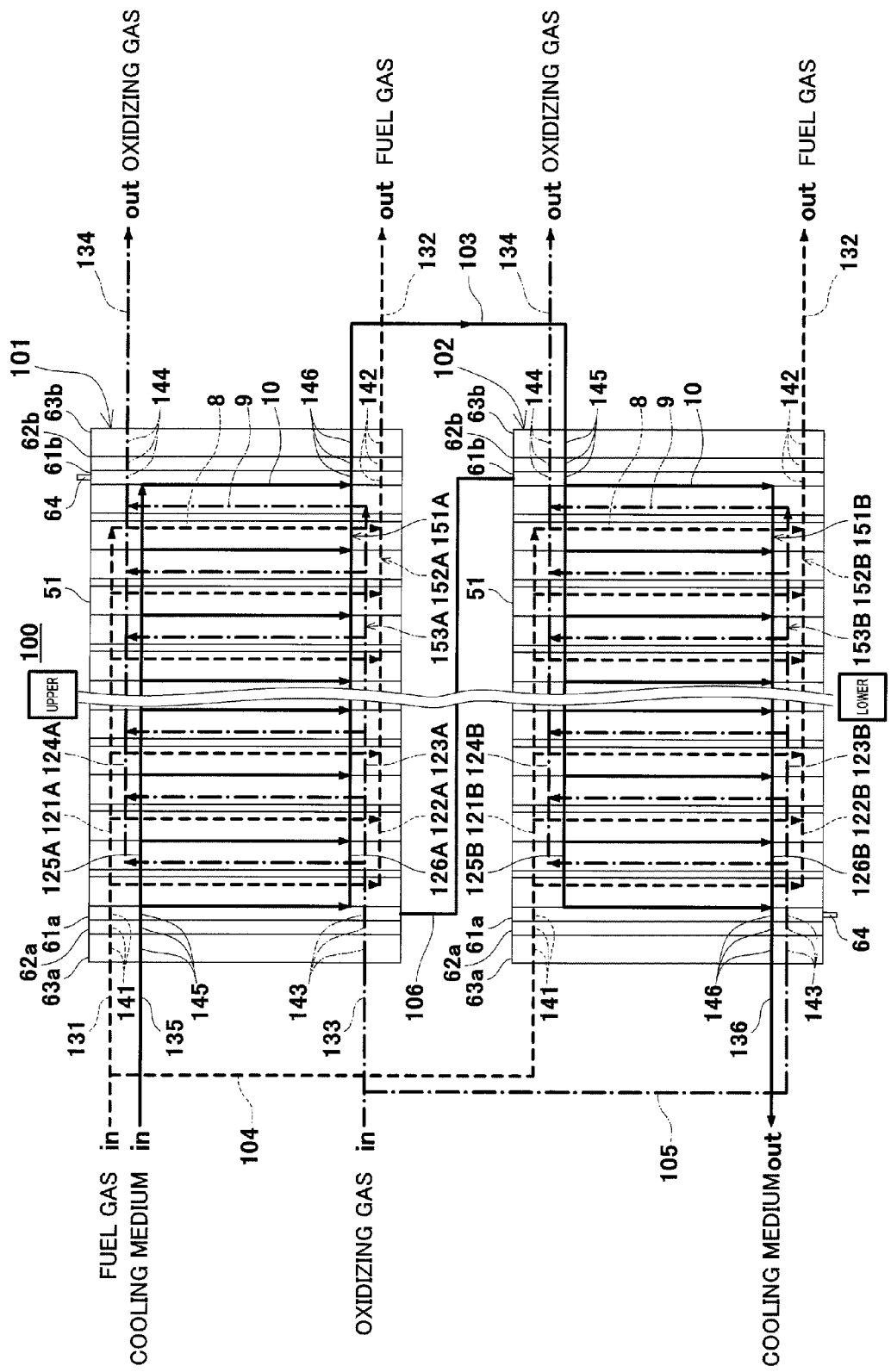
FIG. 18 is a schematic diagram showing a schematic configuration of the fuel cell according to Embodiment 4 of the present invention.

FIG. 18 is a schematic diagram showing a schematic configuration of the fuel cell according to Embodiment 4 of the present invention.

As shown in FIG. 18, the fuel cell 100 according to Embodiment 4 of the present invention is the same in basic configuration as the fuel cell 100 according to Embodiment 1 but is different from the fuel cell 100 according to Embodiment 1 in that: the cell block internal fuel gas channel 152A of the first cell block 101 and the cell block internal fuel gas channel 152B of the second cell block 102 are connected to each other in parallel; and the cell block internal oxidizing gas channel 153A of the first cell block 101 and the cell block internal oxidizing gas channel 153B of the second cell block 102 are connected to each other in parallel.

Specifically, an upstream end of the fuel gas connecting channel 104 is connected to a portion of the fuel gas supplying passage 131, and a downstream end thereof is connected to an upstream end of the cell block internal fuel gas channel 152B via the through holes 141 of the second cell block 102. Moreover, the fuel gas supplying passage 131 is connected to an upstream end of the cell block internal fuel gas channel 152A via the through holes 141 of the first cell block 101.

Similarly, an upstream end of the oxidizing gas connecting channel 105 is connected to a portion of the oxidizing gas supplying passage 133, and a downstream end thereof is connected to an upstream end of the cell block internal oxidizing gas channel 153B via the through holes 143 of the second cell block 102. Moreover, the oxidizing gas supplying passage 133 is connected to an upstream end of the cell block internal oxidizing gas channel 153A via the through holes 143 of the first cell block 101.

With this, a part of the fuel gas flowing through the fuel gas supplying passage 131 flows to the fuel gas connecting channel 104. Thus, the fuel gas is supplied to the cell block internal fuel gas channel 152A of the first cell block 101 and the cell block internal fuel gas channel 152B of the second cell block 102. Moreover, a part of the oxidizing gas flowing through the oxidizing gas supplying passage 133 flows to the oxidizing gas connecting channel 105. Thus, the oxidizing gas is supplied to the cell block internal oxidizing gas channel 153A of the first cell block 101 and the cell block internal oxidizing gas channel 153B of the second cell block 102.

Moreover, the fuel gas discharging passage 132 is connected to a downstream end of the cell block internal fuel gas channel 152A of the first cell block 101 via the through holes 142, and the oxidizing gas discharging passage 134 is connected to a downstream end of the cell block internal oxidizing gas channel 153A via the through holes 144. Similarly, the fuel gas discharging passage 132 is connected to a downstream end of the cell block internal fuel gas channel 152B of the second cell block 102 via the through holes 142, and the oxidizing gas discharging passage 134 is connected to a downstream end of the cell block internal oxidizing gas channel 153B via the through holes 144. With this, the fuel gas unconsumed in the cell block internal fuel gas channel 152A of the first cell block 101 and the fuel gas unconsumed in the cell block internal fuel gas channel 152B of the second cell block 102 are respectively discharged to the fuel gas discharging passage 132 of the first cell block 101 and the fuel gas discharging passage 132 of the second cell block 102. Moreover, the oxidizing gas unconsumed in the cell block internal oxidizing gas channel 153A of the first cell block 101 and the oxidizing gas unconsumed in the cell block internal oxidizing gas channel 153B of the second cell block 102 are respectively discharged to the oxidizing gas discharging passage 134 of the first cell block 101 and the oxidizing gas discharging passage 134 of the second cell block 102.

As with the fuel cell 100 according to Embodiment 1, in the fuel cell 100 according to Embodiment 4 configured as above, the cell block internal cooling medium channel 151A of the first cell block 101 and the cell block internal cooling medium channel 151B of the second cell block 102 are connected to each other in series by the cooling medium connecting channel 103. Therefore, the temperature inside the second cell block 102 can be set to be higher than that inside the first cell block 101, and the cooling medium discharged from the second cell block 102 can be increased in temperature.

Moreover, in the fuel cell 100 according to Embodiment 4, the cell block internal fuel gas channel 152A of the first cell block 101 and the cell block internal fuel gas channel 152B of the second cell block 102 are connected to each other in parallel by the fuel gas connecting channel 104, and the cell block internal oxidizing gas channel 153A of the first cell block 101 and the cell block internal oxidizing gas channel 153B of the second cell block 102 are connected to each other in parallel by the oxidizing gas connecting channel 105.

Therefore, the amount of moisture (humidification amount) contained in the fuel gas supplied to the first cell block 101 and the amount of moisture (humidification amount) contained in the fuel gas supplied to the second cell block 102 become the same as each other, and the amount of moisture (humidification amount) contained in the oxidizing gas supplied to the first cell block 101 and the amount of moisture (humidification amount) contained in the oxidizing gas supplied to the second cell block 102 become the same as each other.

However, as described above, since the inside of the second cell block 102 is higher in temperature than that of the first cell block 101, the fuel gas and the oxidizing gas supplied to the second cell block 102 are lower in relative humidity than the fuel gas and the oxidizing gas supplied to the first cell block 101.

Then, the first cell 51 and the second cell 52 of the fuel cell 100 according to Embodiment 4 are configured in the same manner as the first cell 51 and the second cell 52 of the fuel cell 100 according to Embodiment 1. Therefore, the fuel cell 100 according to Embodiment 4 obtains the same operational advantages as the fuel cell 100 according to Embodiment 1.

Embodiment 5

Figure 19:
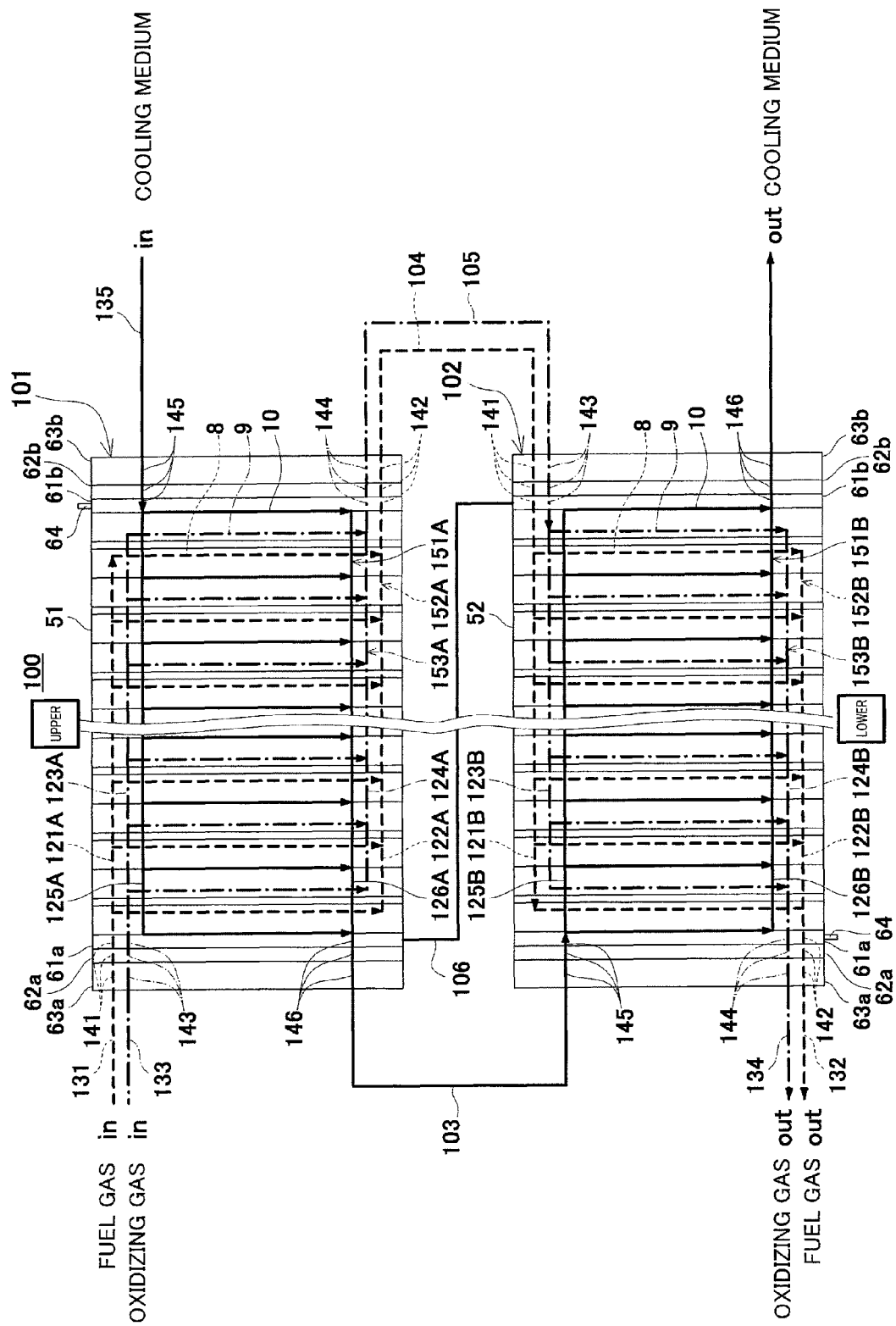
FIG. 19 is a schematic diagram showing a schematic configuration of the fuel cell according to Embodiment 5 of the present invention.
Figure 20:
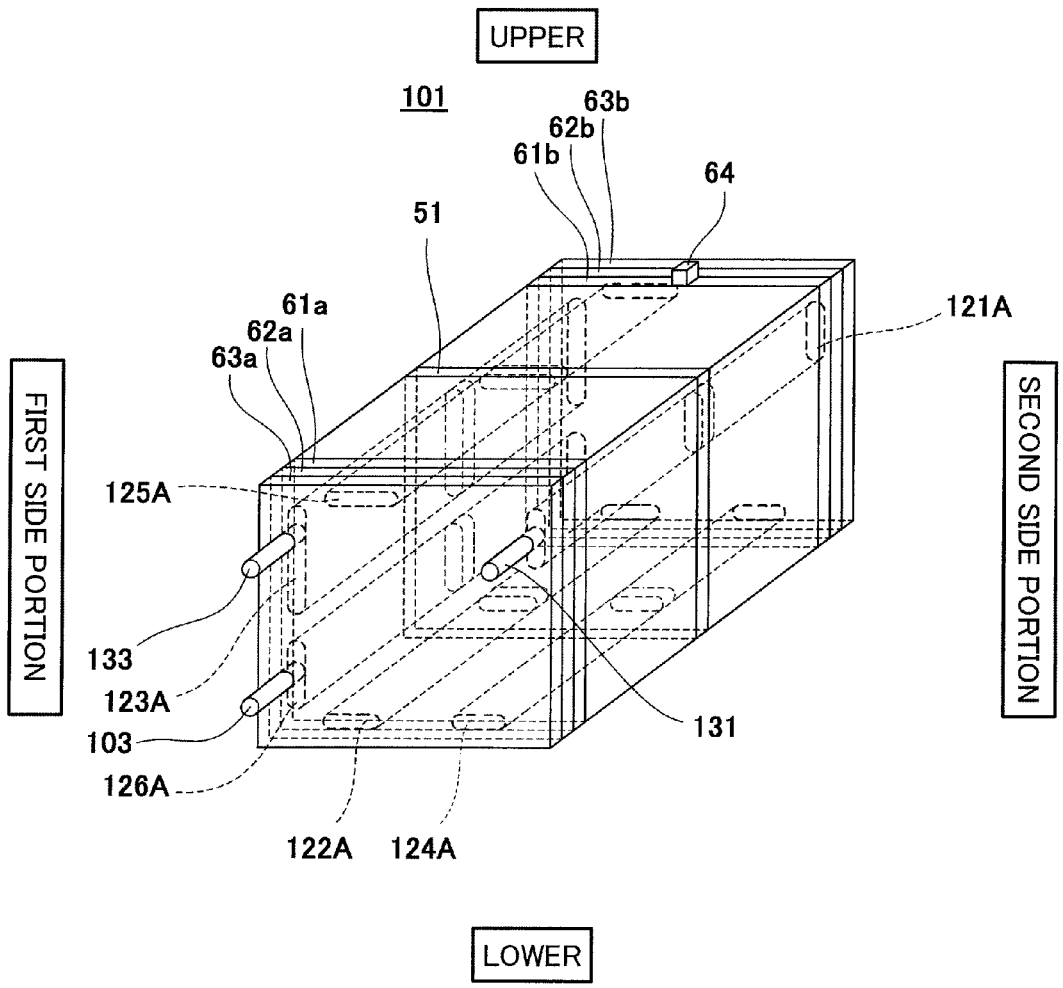
FIG. 20 is a perspective view schematically showing a schematic configuration of a first cell block of the fuel cell shown in FIG. 19.
Figure 21:
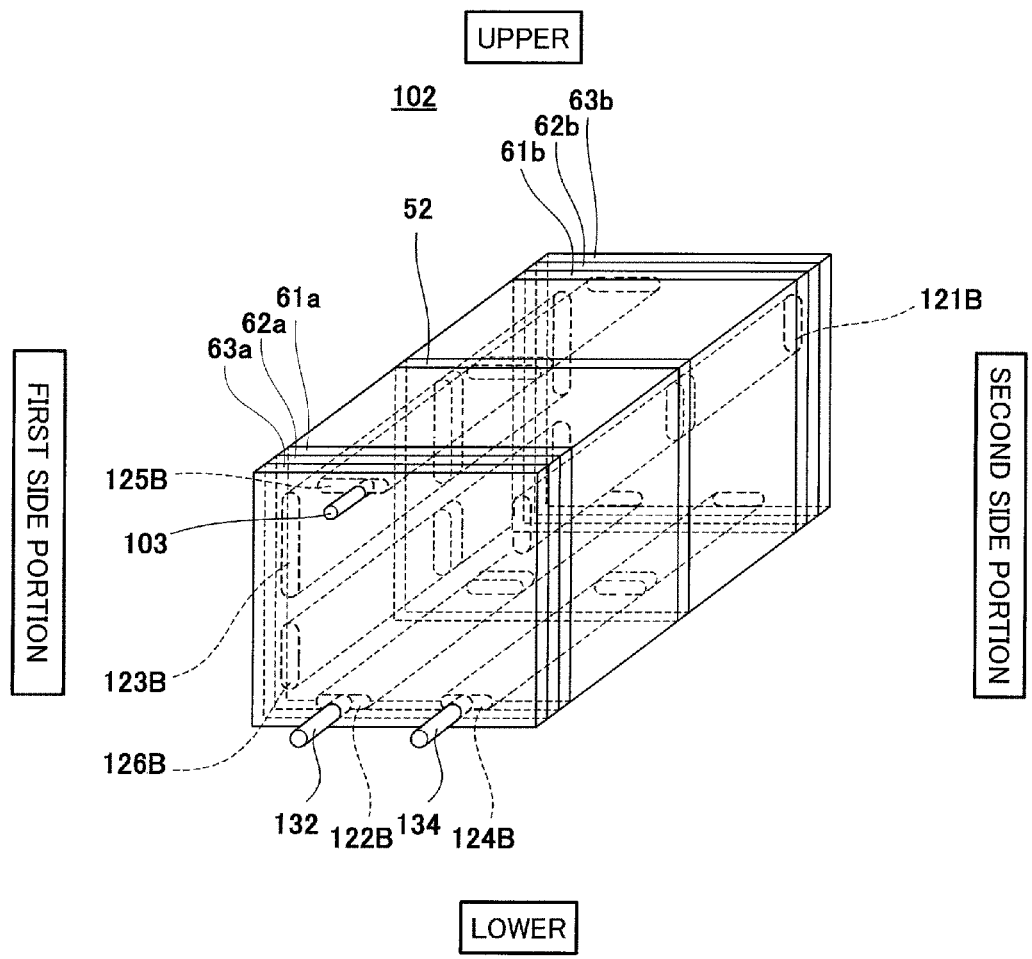
FIG. 21 is a perspective view schematically showing a schematic configuration of a second cell block of the fuel cell shown in FIG. 19.

FIG. 19 is a schematic diagram showing a schematic configuration of the fuel cell according to Embodiment 5 of the present invention. FIG. 20 is a perspective view schematically showing a schematic configuration of the first cell block of the fuel cell shown in FIG. 19. FIG. 21 is a perspective view schematically showing a schematic configuration of the second cell block of the fuel cell shown in FIG. 19. In FIG. 20, a vertical direction of the first cell block is shown as a vertical direction of the drawing. In FIG. 21, a vertical direction of the second cell block is shown as a vertical direction of the drawing.

As shown in FIGS. 19 to 21, the fuel cell 100 according to Embodiment 5 of the present invention is the same in basic configuration as the fuel cell 100 according to Embodiment 1 but is different from the fuel cell 100 according to Embodiment 1 in that each of the first cell block 101 and the second cell block 102 is configured such that the flow of the reactant gases become a so-called parallel flow. Here, the parallel flow denotes such a flow that although the oxidizing gas and the fuel gas partially flow in directions opposed to each other when viewed from the thickness direction of the first cell 51 (or the second cell 52), the flow direction of the oxidizing gas and the flow direction of the fuel gas are the same as each other from upstream to downstream when viewed macroscopically (as a whole).

Specifically, as shown in FIGS. 19 and 20, the oxidizing gas supplying manifold 123A is formed at an upper portion of the first side portion of the first cell block 101, and the cooling medium discharging manifold 126A is formed at a lower portion of the first side portion of the first cell block 101. Moreover, the cooling medium supplying manifold 125A is formed on an inner side of the oxidizing gas supplying manifold 123A, and the fuel gas discharging manifold 122A is formed on an inner side of the cooling medium discharging manifold 126A.

Moreover, the fuel gas supplying manifold 121A is formed at an upper portion of the second side portion of the first cell block 101, and the oxidizing gas discharging manifold 124A is formed at a lower portion of the second side portion of the first cell block 101.

Then, each of the first current collector 61*a*, the first insulating plate 62*a*, and the first end plate 63*a* is provided with the through hole 146 which is communicated with the cooling medium discharging manifold 126A. Moreover, each of the second current collector 61*b*, the second insulating plate 62*b*, and the second end plate 63*b* is provided with the through hole 145 which is communicated with the cooling medium supplying manifold 125A. In Embodiment 5, the through hole 146 is formed on each of the first current collector 61*a*, the first insulating plate 62*a*, and the first end plate 63*a*, and the through hole 145 is formed on each of the second current collector 61*b*, the second insulating plate 62*b*, and the second end plate 63*b*. However, the present embodiment is not limited to this. As with Embodiment 1, the through hole 145 may be formed on each of the first current collector 61*a*, the first insulating plate 62*a*, and the first end plate 63*a*, and the through hole 146 may be formed on each of the second current collector 61*b*, the second insulating plate 62*b*, and the second end plate 63*b*.

Moreover, as shown in FIGS. 19 and 21, the oxidizing gas supplying manifold 123B is formed at an upper portion of the first side portion of the second cell block 102, and the cooling medium discharging manifold 126B is formed at a lower portion of the first side portion of the second cell block 102. Moreover, the cooling medium supplying manifold 125B is formed on an inner side of the oxidizing gas supplying manifold 123B, and the fuel gas discharging manifold 122B is formed on an inner side of the cooling medium discharging manifold 126B.

Moreover, the fuel gas supplying manifold 121B is formed at an upper portion of the second side portion of the second cell block 102, and the oxidizing gas discharging manifold 124B is formed at a lower portion of the second side portion of the second cell block 102.

Then, each of the first current collector 61*a*, the first insulating plate 62*a*, and the first end plate 63*a* is provided with the through hole 145 which is communicated with the cooling medium supplying manifold 125B. Moreover, each of the second current collector 61*b*, the second insulating plate 62*b*, and the second end plate 63*b* is provided with the through hole 146 which is communicated with the cooling medium discharging manifold 126B. In Embodiment 5, the through hole 145 is formed on each of the first current collector 61*a*, the first insulating plate 62*a*, and the first end plate 63*a*, and the through hole 145 is formed on each of the second current collector 61*b*, the second insulating plate 62*b*, and the second end plate 63*b*. However, the present embodiment is not limited to this. As with Embodiment 1, the through hole 146 may be formed on each of the first current collector 61*a*, the first insulating plate 62*a*, and the first end plate 63*a*, and the through hole 145 may be formed on each of the second current collector 61*b*, the second insulating plate 62*b*, and the second end plate 63*b*.

The fuel cell 100 according to Embodiment 5 configured as above obtains the same operational advantages as the fuel cell 100 according to Embodiment 1.

Embodiment 6

Figure 22:
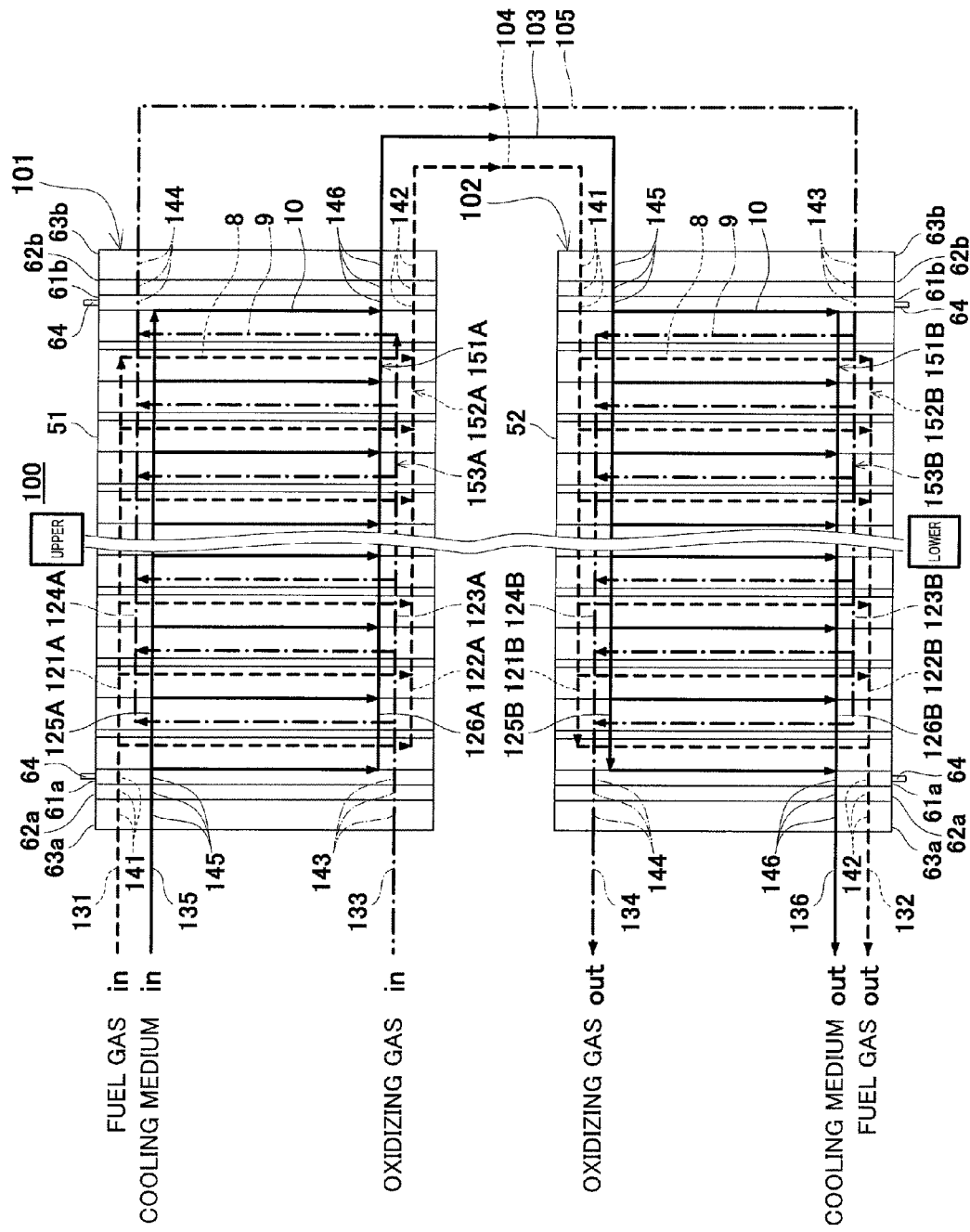
FIG. 22 is a schematic diagram showing a schematic configuration of the fuel cell according to Embodiment 6 of the present invention.

FIG. 22 is a schematic diagram showing a schematic configuration of the fuel cell according to Embodiment 6 of the present invention.

As shown in FIG. 22, the fuel cell 100 according to Embodiment 6 of the present invention is the same in basic configuration as the fuel cell 100 according to Embodiment 1 but is different from the fuel cell 100 according to Embodiment 1 in that the first cell block 101 and the second cell block 102 are not electrically connected to each other in series. To be specific, the fuel cell 100 according to Embodiment 6 is different from the fuel cell 100 according to Embodiment 1 in that the electric power is separately obtained from the first cell block 101 and the second cell block 102.

Specifically, the first cell block 101 and the second cell block 102 are not electrically connected to each other by the electric wire 106 in series. Thus, each of the first current collector 61a of the first cell block 101 and the second current collector 61b of the second cell block 102 is provided with the terminals 64. Then, one end of an electric wire (not shown) is connected to the terminal 64 of the first cell block 101, and the other end thereof is connected to an inverter (not shown in FIG. 6). Similarly, one end of an electric wire (not shown) is connected to the terminal 64 of the second cell block 102, and the other end thereof is connected to an inverter (not shown in FIG. 6).

The fuel cell 100 according to Embodiment 6 configured as above can cause the electric power obtained from the first cell block 101 and the electric power obtained from the second cell block 102 to be different from each other. With this, the fuel cell 100 according to Embodiment 6 can change the fuel gas utilization ratio and the oxidizing gas utilization ratio of the first cell block 101 and the fuel gas utilization ratio and the oxidizing gas utilization ratio of the second cell block 102. On this account, the electric power generating operation can be carried out under such conditions that the relative humidity of the fuel gas flowing through the cell block internal fuel gas channel 152B of the second cell block 102 is lower than the relative humidity of the fuel gas flowing through the cell block internal fuel gas channel 152A of the first cell block 101 and the relative humidity of the oxidizing gas flowing through the cell block internal oxidizing gas channel 153B of the second cell block 102 is lower than the relative humidity of the oxidizing gas flowing through the cell block internal oxidizing gas channel 153A of the first cell block 101 by adjusting the fuel gas utilization ratio and the oxidizing gas utilization ratio of the first cell block 101 and the fuel gas utilization ratio and the oxidizing gas utilization ratio of the second cell block 102.

Then, the first cell 51 and the second cell 52 of the fuel cell 100 according to Embodiment 6 are configured in the same manner as the first cell 51 and the second cell 52 of the fuel cell 100 according to Embodiment 1. Therefore, the fuel cell 100 according to Embodiment 6 obtains the same operational advantages as the fuel cell 100 according to Embodiment 1.

Embodiment 7

Configuration of Fuel Cell System

Figure 23:
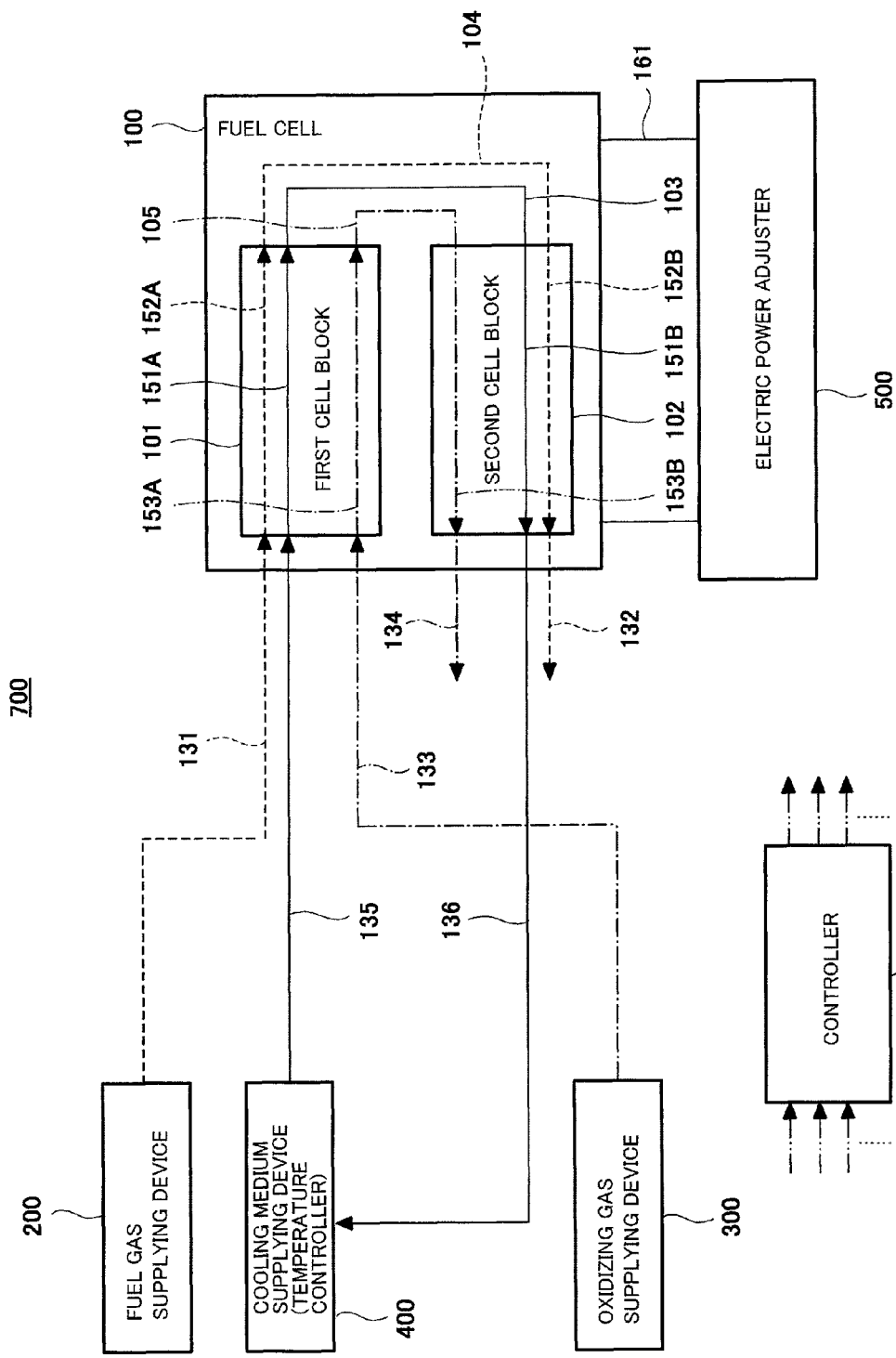
FIG. 23 is a schematic diagram showing a schematic configuration of a fuel cell system according to Embodiment 7 of the present invention.

FIG. 23 is a schematic diagram showing a schematic configuration of a fuel cell system according to Embodiment 7 of the present invention.

As shown in FIG. 23, a fuel cell system 700 according to Embodiment 7 of the present invention includes the fuel cell 100 according to Embodiment 1, a fuel gas supplying device 200, an oxidizing gas supplying device 300, a cooling medium supplying device (temperature controller) 400, an electric power adjuster 500, and a controller 600. The controller 600 is configured to generate electric power under such conditions that the relative humidity of the fuel gas flowing through the cell block internal fuel gas channel 152B of the second cell block 102 is lower than the relative humidity of the fuel gas flowing through the cell block internal fuel gas channel 152A of the first cell block 101 and the relative humidity of the oxidizing gas flowing through the cell block internal oxidizing gas channel 153B of the second cell block 102 is lower than the relative humidity of the oxidizing gas flowing through the cell block internal oxidizing gas channel 153A of the first cell block 101. Moreover, the controller 600 may be configured to carry out the electric power generating operation under such a condition that the dew point of each of the fuel gas and the oxidizing gas supplied to the fuel cell 100 is lower than the temperature of the cooling medium supplied to the fuel cell 100.

The fuel cell 100 (to be precise, the first cell block 101) is connected to the fuel gas supplying device 200 via the fuel gas supplying passage 131. For example, the fuel gas supplying device 200 includes a hydrogen generator, a hydrogen bomb, a hydrogen absorbing alloy, or the like, and further includes a humidifier and a flow rate adjuster (all of which are not shown). The hydrogen generator generates the fuel gas (hydrogen gas) from a material gas (such as a methane gas or a propane gas) and water. Moreover, the humidifier may be any device as long as it can humidify the fuel gas supplied from the hydrogen generator or the like. For example, in a case where the cooling medium is water, the humidifier may be a total enthalpy heat exchanger configured to carry out total enthalpy heat exchange with the cooling medium or may be a typical humidifier configured to generate steam from water stored in a tank or the like to humidify the fuel gas. For example, the flow rate adjuster may be constituted by a flow rate adjustable pump or a combination of a pump and a flow rate control valve.

Moreover, the fuel cell 100 (to be precise, the first cell block 101) is connected to the oxidizing gas supplying device 300 via the oxidizing gas supplying passage 133. For example, the oxidizing gas supplying device 105 includes a fan device, such as a fan or a blower, a humidifier, and a flow rate adjuster (all of which are not shown). The humidifier may be any device as long as it can humidify the oxidizing gas supplied from the fan device. For example, in a case where the cooling medium is water, the humidifier may be a total enthalpy heat exchanger configured to carry out total enthalpy heat exchange with the cooling medium or may be a typical humidifier configured to generate steam from water stored in a tank or the like to humidify the oxidizing gas. For example, the flow rate adjuster may be constituted by a flow rate adjustable pump or a combination of a pump and a flow rate control valve.

With this, the fuel gas suitably humidified flows from the fuel gas supplying device 200 through the fuel gas supplying passage 131 to be supplied to the fuel cell 100 (to be precise, the first cell block 101), and the oxidizing gas suitably humidified flows from the oxidizing gas supplying device 300 through the oxidizing gas supplying passage 133 to be supplied to the fuel cell 100 (to be precise, the first cell block 101).

The fuel gas supplied to the first cell block 101 flows through the cell block internal fuel gas channel 152A and the fuel gas connecting channel 104 to be supplied to the second cell block 102. Moreover, the oxidizing gas supplied to the second cell block 102 flows through the cell block internal oxidizing gas channel 153A and the oxidizing gas connecting channel 105 to be supplied to the second cell block.

Then, the fuel gas supplied to the second cell block 102 flows through the cell block internal fuel gas channel 152B. The fuel gas unconsumed in the first cell block 101 and the second cell block 102 is discharged to the fuel gas discharging passage 132. Moreover, the oxidizing gas supplied to the second cell block 102 flows through the cell block internal oxidizing gas channel 153B. The oxidizing gas unconsumed in the first cell block 101 and the second cell block 102 is discharged to the oxidizing gas discharging passage 134. For example, the unused fuel gas may be adequately diluted with the unused oxidizing gas to be discharged to the atmosphere. In a case where the fuel gas supplying device 200 is constituted by a hydrogen generator, the unused fuel gas may be supplied to a combustor (not shown) of the hydrogen generator.

The fuel cell 100 (to be precise, the first cell block 101) is connected to the cooling medium supplying device 400 via the cooling medium supplying passage 135. For example, the cooling medium supplying device 400 includes a tank configured to store the cooling medium supplied from outside, a cooling medium temperature adjuster, a pump, and a flow rate control valve. Examples of the cooling medium temperature adjuster are heaters, such as a heat exchanger configured to carry out heat exchange with the fuel gas, the oxidizing gas, and the like and a heater configured to heat the cooling medium, and a cooler configured to cool down the cooling medium. Moreover, examples of the cooling medium are antifreezing fluids, such as water and ethylene glycol. In Embodiment 7, the cooling medium supplying device 400 is constituted by the tank, the pump, and the flow rate control valve. However, the present embodiment is not limited to this. In a case where the pump can adjust the flow rate, the flow rate control valve may be omitted.

With this, the cooling medium whose temperature is suitably controlled flows from the cooling medium supplying device 400 through the cooling medium supplying passage 135 to be supplied to the first cell block 101. The cooling medium supplied to the first cell block 101 flows through the cell block internal cooling medium channel 151A and the cooling medium connecting channel 103 to be supplied to the second cell block 102. The cooling medium supplied to the second cell block 102 flows through the cell block internal cooling medium channel 151B and the cooling medium discharging passage 136 to be supplied to the cooling medium supplying device 400, and the temperature of the cooling medium is adjusted to a suitable temperature by the cooling medium supplying device 400. Thus, the temperature of the fuel cell 100 is adjusted by the cooling medium supplying device 400. In Embodiment 7, the cooling medium circulates in the cooling medium supplying device 400 and the fuel cell 100. However, the present embodiment is not limited to this. The cooling medium may be discharged through the cooling medium discharging passage 136 to an outside of the fuel cell system 700.

Moreover, the electric power adjuster 500 is connected to the fuel cell 100 (to be precise, each of the terminal 64 of the first cell block 101 and the terminal 64 of the second cell block 102 (see FIG. 1)) via electric wires 161. For example, the electric power adjuster 500 includes a converter configured to convert the DC power generated by the fuel cell 100 into a DC voltage and an inverter configured to convert the DC power output from the converter into an AC power. Then, the electric power adjuster 500 is controlled by the controller 600 so as to adjust the electric power obtained from the fuel cell 100.

Moreover, the controller 600 is constituted by a computer, such as a microcomputer. The controller 600 controls respective devices of the fuel cell system 700 to control respective operations, such as the electric power generating operation, of the fuel cell system 700. For example, the controller 600 includes a CPU, an internal memory constituted by a semiconductor memory, a communication portion, and a clock portion having a calendar function (all of which are not shown). Here, in the present invention, the controller denotes not only a single controller but also a group of a plurality of controllers which cooperate with one another to control the fuel cell system 700. Therefore, the controller 600 does not have to be constituted by a single controller but may be configured such that a plurality of controllers are dispersively arranged to control the fuel cell system 700 in cooperation with each other.

Operations (Operating Method) of Fuel Cell System

Next, a method for carrying out the electric power generating operation of the fuel cell system 700 according to Embodiment 7 will be explained. The following operations are carried out such that the controller 600 controls the fuel cell system 700.

First, the fuel gas is supplied from the fuel gas supplying device 200 to the fuel cell 100 (to be precise, the first cell block 101), and the oxidizing gas is supplied from the oxidizing gas supplying device 300 to the fuel cell 100 (to be precise, the first cell block 101). Moreover, the cooling medium is supplied from the cooling medium supplying device 400 to the fuel cell 100 (to be precise, the first cell block 101). At this time, the controller 600 may control the flow rates of the fuel gas, the oxidizing gas, and the cooling medium such that each of the dew point of the fuel gas supplied to the fuel cell 100 and the dew point of the oxidizing gas supplied to the fuel cell 100 becomes lower than the temperature of the cooling medium supplied to the fuel cell 100.

The fuel gas and the oxidizing gas supplied to the first cell block 101 react with each other in the MEA 5 of the first cell 51 to generate water and heat. Then, the fuel gas and the oxidizing gas are humidified by the generated water. The humidified fuel gas and the humidified oxidizing gas respectively flows through the fuel gas connecting channel 104 and the oxidizing gas connecting channel 105 to be supplied to the second cell block 102. Moreover, the generated heat is recovered by the cooling medium supplied to the first cell block 101, and the cooling medium having recovered the heat is supplied through the cooling medium connecting channel 103 to the second cell block 102.

The fuel gas and the oxidizing gas supplied to the second cell block 102 react with each other in the MEA 5 of the second cell 52 to generate water and heat. Then, the fuel gas and the oxidizing gas are humidified by the generated water, and the humidified unused fuel gas and the humidified unused oxidizing gas are respectively discharged to the fuel gas discharging passage 133 and the oxidizing gas discharging passage 135. Moreover, the generated heat is recovered by the cooling medium supplied to the second cell block 102. The cooling medium having recovered the heat is supplied through the cooling medium discharging passage 136 to the cooling medium supplying device 400.

With this, the polymer electrolyte membrane 1 of the second cell 52 of the second cell block 102 can be further prevented from drying. Moreover, the internal temperature of the second cell block 102 can be set to be higher than that of the first cell block 101. Moreover, while the cooling medium heated by flowing through the first cell block 101 flows through the second cell block 102, the cooling medium recovers the heat generated by the reaction between the fuel gas and the oxidizing gas in the MEA 5 of the second cell 52 to be further heated. Therefore, the cooling medium discharged from the cell block internal cooling medium channel 153B (to be precise, the cooling medium discharging manifold 126B) of the second cell block 102 can be further increased in temperature. Further, since the internal temperature of the second cell block 102 is higher than that of the first cell block 101 (for example, the first cell block 101 is 65° C., and the second cell block 102 is 80° C.), the relative humidity of the fuel gas flowing through the cell block internal fuel gas channel 152B of the second cell block 102 can be set to be lower than the relative humidity of the fuel gas flowing through the cell block internal fuel gas channel 152A of the first cell block 101, and the relative humidity of the oxidizing gas flowing through the cell block internal oxidizing gas channel 153B of the second cell block 102 can be set to be lower than the relative humidity of the oxidizing gas flowing through the cell block internal oxidizing gas channel 153A of the first cell block 101.

Then, the electric power generated by the fuel cell 100 is supplied by the electric power adjuster 500 to an external electric power load. The amount of electric power obtained from the fuel cell 100 is adjusted by the electric power adjuster 500 which is controlled by the controller 600.

As above, the fuel cell system 700 according to Embodiment 7 can generate the electric power under such conditions that the relative humidity of the fuel gas flowing through the cell block internal fuel gas channel 152B of the second cell block 102 is lower than the relative humidity of the fuel gas flowing through the cell block internal fuel gas channel 152A of the first cell block 101 and the relative humidity of the oxidizing gas flowing through the cell block internal oxidizing gas channel 153B of the second cell block 102 is lower than the relative humidity of the oxidizing gas flowing through the cell block internal oxidizing gas channel 153A of the first cell block 101.

Moreover, since the fuel cell system 700 according to Embodiment 7 includes the fuel cell 100 according to Embodiment 1, the fuel cell system 700 obtains the same operational advantages as the fuel cell 100 according to Embodiment 1.

The fuel cell system 700 according to Embodiment 7 is configured to include the fuel cell 100 according to Embodiment 1. However, the present embodiment is not limited to this. The fuel cell system 700 may be configured to include any one of the fuel cells 100 according to Embodiments 2 to 6.

Especially, in a case where the fuel cell system 700 includes the fuel cell 100 according to Embodiment 6, the electric power adjuster 500 controlled by the controller 600 can cause the electric power obtained from the first cell block 101 and the electric power obtained from the second cell block 102 to be different from each other. With this, the fuel gas utilization ratio and the oxidizing gas utilization ratio of the first cell block 101 and the fuel gas utilization ratio and the oxidizing gas utilization ratio of the second cell block 102 can be changed. On this account, the electric power generating operation can be carried out under such conditions that the relative humidity of the fuel gas flowing through the cell block internal fuel gas channel 152B of the second cell block 102 is lower than the relative humidity of the fuel gas flowing through the cell block internal fuel gas channel 152A of the first cell block 101 and the relative humidity of the oxidizing gas flowing through the cell block internal oxidizing gas channel 153B of the second cell block 102 is lower than the relative humidity of the oxidizing gas flowing through the cell block internal oxidizing gas channel 153A of the first cell block 101 by adjusting the fuel gas utilization ratio and the oxidizing gas utilization ratio of the first cell block 101 and the fuel gas utilization ratio and the oxidizing gas utilization ratio of the second cell block 102.

Each of the fuel cells 100 according to Embodiments 1 to 4, and 6 is configured such that the flow of the reactant gases is the so-called opposed flow in each of the first cell block 101 and the second cell block 102. However, each of Embodiments 1 to 4, and 6 is not limited to this. Each of the first cell block 101 and the second cell block 102 may be configured to realize the so-called parallel flow. Moreover, the first cell block 101 may be configured to realize the opposed flow, and the second cell block 102 may be configured to realize the parallel flow. Further, the first cell block 101 may be configured to realize the parallel flow, and the second cell block 102 may be configured to realize the opposed flow.

Moreover, the fuel cell 100 according to Embodiment 5 is configured such that the flow of the reactant gases is the so-called parallel flow in each of the first cell block 101 and the second cell block 102. However, Embodiment 5 is not limited to this. The first cell block 101 may be configured to realize the opposed flow, and the second cell block 102 may be configured to realize the parallel flow. Further, the first cell block 101 may be configured to realize the parallel flow, and the second cell block 102 may be configured to realize the opposed flow.

Moreover, in each of the fuel cells 100 according to Embodiments 1 to 3, 5, and 6, the cell block internal fuel gas channel 152A of the first cell block 101 and the cell block internal fuel gas channel 152B of the second cell block 102 are connected to each other in series. However, as with Embodiment 4, these channels 152A and 152B may be connected to each other in parallel. Similarly, in each of the fuel cells 100 according to Embodiments 1 to 3, 5, and 6, the cell block internal oxidizing gas channel 153A of the first cell block 101 and the cell block internal oxidizing gas channel 153B of the second cell block 102 are connected to each other in series. However, as with Embodiment 4, these channels 153A and 153B may be connected to each other in parallel.

Moreover, in each of the fuel cells 100 according to Embodiments 1 to 6, the first cell block 101 and the second cell block 102 are arranged to be lined up in the vertical direction. However, the present invention is not limited to this. The first cell block 101 and the second cell block 102 may be arranged to be lined up in the horizontal direction.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions may be made by a suitable combination of a plurality of components disclosed in the above embodiments.

INDUSTRIAL APPLICABILITY

The fuel cell of the present invention is useful in a fuel cell field since it can increase the temperature of the cooling medium discharged from the fuel cell and realize high power generation efficiency without increasing the cost and size of the humidifier.

REFERENCE SIGNS LIST 1 polymer electrolyte membrane
2a anode catalyst layer
2b cathode catalyst layer
3a anode gas diffusion layer
3b cathode gas diffusion layer 4a anode
4b cathode
5 (Membrane Electrode Assembly; polymer electrolyte layer-electrode stack body)
6a anode separator
6b cathode separator
7 gasket
8 fuel gas channel
9 oxidizing gas channel
10 cooling medium channel
51 first cell
52 second cell
61a first current collector
61b second current collector
62a first insulating plate
62b second insulating plate
63a first end plate
63b second end plate
64 terminal
101 first cell stack
102 second cell stack
103 cooling medium connecting channel
103a recess
103b recess
103c channel
104 fuel gas connecting channel
104a recess
104b recess
104c channel
105 oxidizing gas connecting channel
105a recess
105b recess
105c channel
106 electric wire
111 connecting plate
111a plate member
111b plate member
111c plate member
111d plate member
111e plate member
111f plate member
111g plate member
112 heat insulating member
121A fuel gas supplying manifold
122A fuel gas discharging manifold
123A oxidizing gas supplying manifold
124A oxidizing gas discharging manifold
125A cooling medium supplying manifold
126A cooling medium discharging manifold
121B fuel gas supplying manifold
122B fuel gas discharging manifold
123B oxidizing gas supplying manifold
124B oxidizing gas discharging manifold
125B cooling medium supplying manifold
126B cooling medium discharging manifold
131 fuel gas supplying passage
132 fuel gas discharging passage
133 oxidizing gas supplying passage
134 oxidizing gas discharging passage
135 cooling medium supplying passage
136 cooling medium discharging passage
141 through hole
142 through hole
143 through hole
144 through hole
145 through hole
146 through hole
151A cell block internal cooling medium channel
152A cell block internal fuel gas channel
153A cell block internal oxidizing gas channel
151B cell block internal cooling medium channel
152B cell block internal fuel gas channel
153B cell block internal oxidizing gas channel
161 electric wire
200 fuel gas supplying device
300 oxidizing gas supplying device
400 cooling medium supplying device (temperature controller)
500 electric power adjuster
600 controller
700 fuel cell system

The invention claimed is:

1. A fuel cell system comprising:
a fuel cell including: a plurality of cell blocks, each of which is formed by stacking cells, each of the cells including a pair of electrodes and a polymer electrolyte layer sandwiched between the pair of electrodes;
a cell block internal fuel gas channel which penetrates each of the cell blocks and through which a fuel gas flows so as to flow through the cells of the cell block;
a cell block internal oxidizing gas channel which penetrates each of the cell blocks and through which an oxidizing gas flows so as to flow through the cells of the cell block;
a cell block internal cooling medium channel which penetrates each of the cell blocks and through which a cooling medium flows so as to flow through the cells of the cell block;
a cooling medium connecting channel connecting the cell block internal cooling medium channel of one of the cell blocks and the cell block internal cooling medium channel of the other cell block in series;
a fuel gas supplying device configured to supply the fuel gas to the fuel cell;
an oxidizing as supplying device configured to supply the oxidizing as to the fuel cell;
a temperature controller configured to control a temperature of the fuel cell;
an electric power adjuster configured to adjust electric power obtained from the fuel cell; and
a controller configured to control the fuel gas supplying device, the oxidizing gas supplying device, the temperature controller, and the electric power adjuster, wherein:
at least one of the pair of electrode includes a catalyst layer,
the catalyst layer includes a catalyst support and a polymer electrolyte material adhered to the catalyst support, the catalyst support containing an electrode catalyst and carbon powder supporting the electrode catalyst,
the catalyst layer in the cells of a cooling medium downstream cell block located downstream of the cooling medium connecting channel is higher or larger in at least one selected from the group consisting of a density of an ion exchange group per unit volume of the catalyst layer, an electrode catalyst supporting amount of the catalyst support of the catalyst layer, and a catalyst supporting rate of the catalyst layer, than the catalyst layer in the cells of a cooling medium upstream cell block located upstream of the cooling medium connecting channel, and
the controller is configured to carry out an electric power generating operation under such conditions that a relative humidity of the fuel gas flowing through the cell block internal fuel gas channel of the cooling medium downstream cell block is lower than that of the fuel gas flowing through the cell block internal fuel gas channel of the cooling medium upstream cell block and a relative humidity of the oxidizing gas flowing through the cell block internal oxidizing gas channel of the cooling medium downstream cell block is lower than that of the oxidizing gas flowing through the cell block internal oxidizing gas channel of the cooling medium upstream cell block.

2. The fuel cell system according to claim 1, wherein the density of the ion exchange group per unit volume of the catalyst layer is a ratio of a mass of the polymer electrolyte material to a mass of the catalyst support of the catalyst layer and/or an ion exchange capacity of the polymer electrolyte material of the catalyst support of the catalyst layer.

3. The fuel cell system according to claim 2, wherein the catalyst layer in the cell of the cooling medium downstream cell block is higher in the ratio of the mass of the polymer electrolyte material to the mass of the catalyst support of the catalyst layer than the catalyst layer in the cell of the cooling medium upstream cell block.

4. The fuel cell system according to claim 2, wherein the catalyst layer in the cell of the cooling medium downstream cell block is larger in the ion exchange capacity of the polymer electrolyte material of the catalyst support of the catalyst layer than the catalyst layer in the cell of the cooling medium upstream cell block.

5. The fuel cell system according to claim 1, wherein the catalyst layer in the cell of the cooling medium downstream cell block is larger in the electrode catalyst supporting amount of the catalyst support of the catalyst layer than the catalyst layer in the cell of the cooling medium upstream cell block.

6. The fuel cell system according to claim 1, wherein the cell blocks are electrically connected to one another in series.

7. The fuel cell system according to claim 1, wherein the cell block internal fuel gas channel and the cell block internal oxidizing gas channel are formed to realize parallel flow.

8. The fuel cell system according to claim 1, further comprising:
a fuel gas connecting channel connecting the cell block internal fuel gas channel of one of the cell blocks and the cell block internal fuel gas channel of the other cell block in series; and
an oxidizing gas connecting channel connecting the cell block internal oxidizing gas channel of one of the cell blocks and the cell block internal oxidizing gas channel of the other cell block in series.

9. The fuel cell system according to claim 8, wherein:
the cooling medium upstream cell block is located upstream of the fuel gas connecting channel and upstream of the oxidizing gas connecting channel; and
the cooling medium downstream cell block is located downstream of the fuel gas connecting channel and downstream of the oxidizing gas connecting channel.

10. The fuel cell system according to claim 1, further comprising:
a fuel gas connecting channel connecting the cell block internal fuel gas channel of one of the cell blocks and the cell block internal fuel gas channel of the other cell block in parallel; and
an oxidizing gas connecting channel connecting the cell block internal oxidizing gas channel of one of the cell blocks and the cell block internal oxidizing gas channel of the other cell block in parallel.

11. The fuel cell system according to claim 1, wherein:
a connecting plate is disposed between one of the cell blocks and the other cell block; and
the cooling medium connecting channel is formed on the connecting plate.

12. The fuel cell system according to claim 1, wherein the plurality of cell blocks are at least two cell blocks disposed next to each other.

13. The fuel cell system according to claim 1, wherein the controller is configured to carry out the electric power generating operation under such a condition that a dew point of each of the fuel gas and the oxidizing gas supplied to the fuel cell is lower than a temperature of the cooling medium supplied to the fuel cell.

14. A method for operating a fuel cell,
the fuel cell comprising:
a plurality of cell blocks, each of which is formed by stacking cells each including a pair of electrodes and a polymer electrolyte layer sandwiched between the pair of electrodes;
a cell block internal fuel gas channel which penetrates each of the cell blocks and through which a fuel gas flows so as to flow through the cells of the cell block;
a cell block internal oxidizing gas channel which penetrates each of the cell blocks and through which an oxidizing gas flows so as to flow through the cells of the cell block;
a cell block internal cooling medium channel which penetrates each of the cell blocks and through which a cooling medium flows so as to flow through the cells of the cell block; and
a cooling medium connecting channel connecting the cell block internal cooling medium channel of one of the cell blocks and the cell block internal cooling medium channel of the other cell block in series, wherein:
a catalyst layer includes a catalyst support and a polymer electrolyte adhered to the catalyst support, the catalyst support containing an electrode catalyst and carbon powder supporting the electrode catalyst;
the catalyst layer in the cell of a cooling medium downstream cell block located downstream of the cooling medium connecting channel is higher or larger in at least one selected from the group consisting of a density of an ion exchange group per unit volume of the catalyst layer, an electrode catalyst supporting amount of the catalyst support of the catalyst layer, and a catalyst supporting rate of the catalyst layer, than the catalyst layer in the cell of a cooling medium upstream cell block located upstream of the cooling medium connecting channel; and
the fuel cell carries out an electric power generating operation under such conditions that a relative humidity of the fuel gas flowing through the cell block internal fuel gas channel of the cooling medium downstream cell block is lower than that of the fuel gas flowing through the cell block internal fuel gas channel of the cooling medium upstream cell block and a relative humidity of the oxidizing gas flowing through the cell block internal oxidizing gas channel of the cooling medium downstream cell block is lower than that of the oxidizing gas flowing through the cell block internal oxidizing gas channel of the cooling medium upstream cell block.

15. The method according to claim 14, wherein the fuel cell carries out the electric power generating operation under such a condition that a dew point of each of the fuel gas and the oxidizing gas supplied to the fuel cell is lower than a temperature of the cooling medium supplied to the fuel cell.

16. The fuel cell system according to claim 1, wherein the fuel gas and the oxidizing gas are supplied to the cooling medium upstream cell block and exhausted fuel gas and oxidizing gas from the cooling medium upstream cell block are supplied to the cooling medium downstream cell block.

17. The fuel cell system according to claim 1, wherein the fuel gas and the oxidizing gas are supplied from a same side of the cell blocks, respectively.

18. A fuel cell system comprising:
- a fuel cell including: a plurality of cell blocks, each of which is formed by stacking cells, each of the cells including a pair of electrodes and a polymer electrolyte layer sandwiched between the pair of electrodes;
- a cell block internal fuel gas channel which penetrates each of the cell and through which a fuel gas flows so as to flow through the cells of the cell block;
- a cell block internal oxidizing gas channel which penetrates each of the cell blocks and through which an oxidizing gas flows so as to flow through the cells of the cell block;
- a cell block internal cooling medium channel which penetrates each of the cell blocks and through which a cooling medium flows so as to flow through the cells of the cell block; and
- a cooling medium connecting channel connecting the cell block internal cooling medium channel of one of the cell blocks and the cell block internal cooling medium channel of the other cell block in series, wherein:
at least one of the pair of electrodes includes a catalyst layer,
the catalyst layer includes a catalyst support and a polymer electrolyte material adhered to the catalyst support, the catalyst support containing an electrode catalyst and carbon powder supporting the electrode catalyst, and
the catalyst layer in the cells of a cell block located downstream of the cooling medium connecting channel is higher or larger in at least one selected from the group consisting of a density of an ion exchange group per unit volume of the catalyst layer, an electrode catalyst supporting amount of the catalyst support of the catalyst layer, and a catalyst supporting rate of the catalyst layer, than the catalyst layer in the cells of a cell block located upstream of the cooling medium connecting channel.

* * * * *